US007409303B2

(12) United States Patent
Yeo et al.

(10) Patent No.: US 7,409,303 B2
(45) Date of Patent: Aug. 5, 2008

(54) IDENTIFYING ENERGY DRIVERS IN AN ENERGY MANAGEMENT SYSTEM

(75) Inventors: Jeffrey W. Yeo, Saanichton (CA); Douglas S. Ransom, Victoria (CA)

(73) Assignee: Power Measurement Ltd., Saanichton, B.C. (CA)

( * ) Notice: Subject to any disclaimer, the term of this patent is extended or adjusted under 35 U.S.C. 154(b) by 0 days.

(21) Appl. No.: 10/775,761

(22) Filed: Feb. 9, 2004

(65) Prior Publication Data
US 2004/0225649 A1 Nov. 11, 2004

Related U.S. Application Data

(60) Provisional application No. 60/445,788, filed on Feb. 7, 2003, provisional application No. 60/445,881, filed on Feb. 7, 2003.

(51) Int. Cl.
*G06F 7/00* (2006.01)
(52) U.S. Cl. ...................................................... 702/60
(58) Field of Classification Search .................. 702/60, 702/62, 44; 713/300, 340; 709/223; 700/286, 700/295; 323/223, 284; 429/22; 705/1; 219/486; 324/74
See application file for complete search history.

(56) References Cited

U.S. PATENT DOCUMENTS

| | | | |
|---|---|---|---|
| 4,261,037 A | 4/1981 | Hicks | ......................... 364/464 |
| 5,627,759 A | 5/1997 | Bearden et al. | |
| 5,758,331 A | 5/1998 | Johnson | ...................... 705/412 |
| 5,825,656 A | 10/1998 | Moore et al. | |
| 6,968,295 B1* | 11/2005 | Carr | ........................... 702/188 |
| 7,050,916 B2 | 5/2006 | Curtis et al. | |
| 2002/0018545 A1 | 2/2002 | Crichlow | |
| 2002/0178047 A1* | 11/2002 | Or et al. | ........................ 705/10 |
| 2004/0138835 A1* | 7/2004 | Ransom et al. | ............... 702/62 |

FOREIGN PATENT DOCUMENTS

GB 2148565 A 10/1983

OTHER PUBLICATIONS

Merriam_Webster Onine, Retrieved from the Internet: <URL: http://www.m-w.com/dictionary/driver>, pp. 2.*
WebGen Systems, Presentation—WebGen's Intelligent Use of Energy (IUE)™ System, http://www.webgensystems.com/mktportal/index.htm, 32 pages, © 2001 WebGen, Inc.
PCT International Search Report PCT/IB2004/000720.
Sezi, T; Duncan; "New Intelligent Electronic Devices Change the Structure of Power Distribution"; 34th Annual IEEE Industry Applications Conference; vol. 2; Oct. 3-7, 1999; pp. 944-952.

(Continued)

*Primary Examiner*—Tung S Lau
(74) *Attorney, Agent, or Firm*—Brinks Hofer Gilson & Lione

(57) ABSTRACT

An application for determining energy drivers is disclosed. The application analyzes quantity metadata and energy usage data to determine at least one relationship. The quality of the relationship between quantity metadata and energy usage data is further assessed. Based on the determined relationship and the assessed quality, the energy driver is identified.

26 Claims, 13 Drawing Sheets

OTHER PUBLICATIONS

Data Loggers & Profile Loggers Sub-Metering Systems kWh Meters & Multi-Parameter Meters Energy & Power Quality Analysers Power Factor Correction, MeterRing™ 2000 Software. Copyright 2001, 3 pages.

Automated Energy News Brief, 2 pages, Oklahoma, © Automated Energy Inc. 2002.

Application Brief, Circadian Information Systems: Circadian Integrates Pi™ With EnterpiseOne™, 6 pages, http://www.circadianinfosystems.com/. © 2000 Circadian Information Systems.

RSEnergyMetrix, Technical Data, Rockwell Software, 4 pages, www.software.rockwell.com, www.rockwellautomation.com, Wisconsin, © 2002 Rockwell Software Inc.

Allen-Bradley, Your Solution for Power & Energy Management, Rockwell Automation, 9 pages, © 19xx Rockwell International Corporation, Jan. 2000.

Energy Profiler Online™ Energy Insight for Your Most Valuable Customers, 2 pages, ABB Inc., www.abb.com Califronia, © 2001 ABB Inc.

Engagenetworks, eBilling [Electronic Billing], 2 pages, www.engagenet.com, Wisconsin, © engagenetworks, copyright 2000, 2001.

Lodestar RateExpert® Reduce Cost with Advanced Rate Analysis, www.lodestarcorp.com, 2 pages, United States, United Kingdom, Australia, Copyright © 2003.

SAIC, News Release, SAIC's Enerlink Division Announces Latest Generation of BillGen®, Complex Billing Engine, http://www.saic.com/, 2 pages, Georgia, May 24, 1999.

Lodestar Financial Management Extension™ v3.5, Accelerate your Cashflow, www.lodestarcorp.com, 2 pages, United States, United Kingdom, Australia, Copyright © 2003.

Lodestar BillingExpert® v3.5, If You Can Sell It, We Can Bill It, www.lodestarcorp.com, 2 pages, United States, United Kingdom, Australia, Copyright © 2003.

Energetics Media Kit, www.energetics.com.au, www.envinta.com, 20 pages, Australia, USA, UK, Energetics Pty Ltd—Mar. 2003.

Class 3000, Powerlogic® Engineered Solutions Billing Module, http://www.powerlogic.com, 2 pages, Square D, Schneider Electric, Tennessee, © 1999.

* cited by examiner

IDENTIFYING ENERGY DRIVERS IN AN ENERGY MANAGEMENT SYSTEM

RELATED APPLICATIONS

This application claims the benefit under 35 U.S.C. §119(e) of U.S. Provisional Application No. 60/445,788, entitled HUMAN-MACHINE INTERFACE FOR AN ENERGY ANALYTICS SYSTEM, filed Feb. 7, 2003, and U.S. Provisional Patent Application No. 60/445,881, entitled ENERGY ANALYTICS FOR AN ENERGY DISTRIBUTION SYSTEM, filed Feb. 7, 2003, which is related to U.S. patent application Ser. No. 10/340,374, entitled PUSH COMMUNICATIONS ARCHITECTURE FOR INTELLIGENT ELECTRONIC DEVICES, filed Jan. 9, 2003, which is a continuation-in-part under 37 CFR § 1.53(b) of U.S. patent application Ser. No. 09/896,570, filed Jun. 29, 2001, which is a continuation-in-part under 37 CFR § 1.53(b) of U.S. patent application Ser. No. 09/814,436, filed Mar. 22, 2001, which is a continuation-in-part under 37 CFR § 1.53(b) of U.S. patent application Ser. No. 09/723,564, filed Nov. 28, 2000, and a continuation-in-part under 37 CFR § 1.53(b) of U.S. patent application Ser. No. 10/068,431, filed Feb. 6, 2002, which is a continuation of U.S. patent application Ser. No. 08/798,723, filed Feb. 12, 1997, now abandoned, the entire disclosures of all of which are herein incorporated by reference.

The following co-pending and commonly assigned U.S. Patent Applications have been filed concurrently with the present application:

U.S. patent application Ser. No. 10/774,814, "HUMAN-MACHINE INTERFACE FOR AN ENERGY ANALYTICS SYSTEM", filed concurrently herewith; and U.S. patent application Ser. No. 10/773,488 "A METHOD AND SYSTEM FOR CALCULATING AND DISTRIBUTING UTILITY COSTS", filed Feb. 6, 2004, the entire disclosures of which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DETAILED DESCRIPTION OF THE PRESENTLY PREFERRED EMBODIMENTS

Figure 1A:
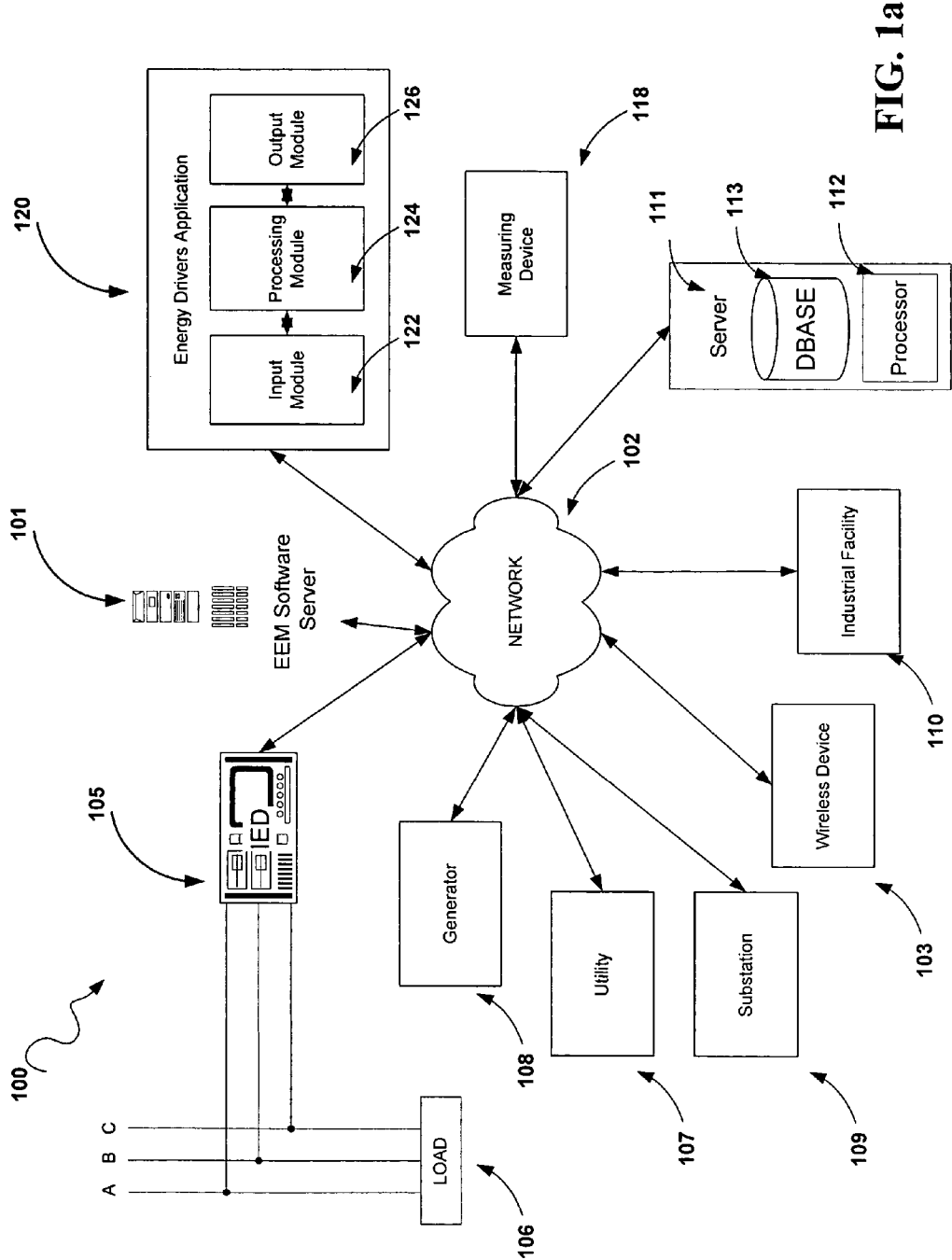
FIG. 1a depicts an exemplary EEM software system.

The evolving global energy environment is more closely connecting the needs of large industrial, commercial and institutional energy consumers with those of the power utilities and energy services companies. In some regions, deregulation of the electricity industry is introducing consumer choice, competition amongst energy suppliers, and significant demands on the electrical industry. Beyond price, large energy consumers are increasingly demanding higher value for their energy investment. Many businesses are likewise increasing their expectation that energy will be delivered at high levels of quality and reliability. These factors are driving both the suppliers and consumers of energy to seek better strategies to manage the cost and quality of the energy product and energy assets that produce, deliver, control and consume it. There are several fundamental challenges: the need to support the economic and efficient delivery, purchasing and use of energy; the need to guarantee higher levels of power quality and reliability; and, the need to supply the increasing demand for energy in a market based pricing system. One approach to solving these challenges is an Enterprise Energy Management ("EEM") system that delivers real-time information and control through efficient, economical and scalable architecture.

Users and suppliers of energy are well positioned to take advantage of these opportunities but the tools to effectively and efficiently manage the energy resources and make informed decisions are lacking. There is a lack of understanding on what drives the costs and how they can be reduced by changes in the operational usage patterns of their particular business. Facility managers will also want to normalize usage patterns with respect to occupancy, temperature, weather and other variables in order to accurately project energy requirements into the future and also determine where further efficiencies can be realized.

Historically, energy management has been a difficult task to accomplish for a variety of reasons. Not all forms of energy can be stored successfully for long periods or, in some cases, at all. Purchasing energy to cover short falls can be expensive, so being able to predict and control the use of energy is an excellent way to reduce these costs. Before energy use can be predicted or controlled it must be measured, not only in real-time but also over a period of time to gather data on trends and cycles of energy usage. With historical energy usage data, predictions can be made as to how energy will be used in the future. Additionally, changes to energy usage can be patterned, modeled and analyzed using historical databases and other non-measured information to see how costs may change.

Using this information, changes in usage patterns can be implemented to optimize the usage of energy assets to meet the goals of the user. Likewise, over time the same energy measurement system can verify that the goals were actually realized, and if not, then help plan further changes as needed. This will help personnel to better manage capital expenditures, extend equipment life and economically schedule maintenance. Reliability of the network can be analyzed and weak points identified for further action. The costs of the loads can be apportioned to the actual uses of energy so the true costs of products and services can be realized. If any of the energy parameters exceed the allowed limits then the EEM system can automatically notify select personnel. The EEM system can then help with the diagnosing and correcting the problem. The EEM system can be geographically distributed across multiple facilities and offer services to a large number of customers. Aggregate billing across the multiple facilities, allocated costs and power quality event reporting can all be accomplished automatically.

In this EEM System there are several integrated applications or components that tie the system together. The EEM system may include one or several of the following software based applications, components or sub-systems: Automated expert control of energy cost management, instantaneous cost engine, inference engine for the Energy Cost Analysis ("ECA"), energy analytics products and services, disaggregation of loads, automatic energy calculation by Supervisory Control And Data Acquisition ("SCADA") program, distributed enterprise rate engine, incremental rate engine, web service for transient analysis, identifying and tracking of energy drivers, monitoring reliability and efficiency of energy systems, energy management notification systems, aggregation and consolidation of historical data from independent EEM systems, improvements to energy management data storage systems, enterprise energy management log, demand responses, and web based display and reporting of energy and energy management variables or data. Each of these will be described in detail below. It can be appreciated that the EEM system may include one or several of the applications, either integrated or stand-alone. The EEM system also may be coupled with hardware components such as computers, relays, metering devices and other Intelligent Electronic Devices ("IEDs"). It is appreciated that an EEM system includes both hardware and software components and may be coupled using a network, such as an LAN, WAN, Intranet or the Internet network. It can also be appreciated that the network connections can include wireless connectivity.

Herein, the phrase "coupled with" is defined to mean directly connected to or indirectly connected through one or more intermediate components. Such intermediate components may include both hardware and software based components.

IEDs include revenue electric watt-hour meters, protection relays, programmable logic controllers, remote terminal units, fault recorders and other devices used to monitor and/or control electrical power distribution and consumption. IEDs are widely available that make use of memory and microprocessors to provide increased versatility and additional functionality. Such functionality includes the ability to communicate with other hosts and remote computing systems through some form of communication channel. IEDs also include legacy mechanical or electromechanical devices that have been retrofitted with appropriate hardware and/or software allowing integration with the EEM system. Typically, an IED is associated with a particular load or set of loads that are drawing electrical power from the power distribution system. The IED may also be capable of receiving data from or controlling its associated load. Depending on the type of IED and the type of load it may be associated with, the IED implements a energy management function that is able to respond to and/or generate management functions, measure energy consumption, control energy distribution such as a relay function, monitor power quality, measure energy parameters such as phasor components, voltage or current, control energy generation facilities, compute revenue, control electrical power flow and load shedding, or combinations thereof. For functions which produce data or other results, the IED can push the data onto the network to another IED or back end server/database, automatically or event driven, or the IED can wait for a polling communication which requests that the data be transmitted to the requester. For the purposes of the disclosed embodiments, a computer is defined as a device which comprises a processing unit and includes, but is not limited to, personal computers, terminals, network appliances, Personal Digital Assistants ("PDAs"), wired and wireless devices, tablet personal computers, game boxes, mainframes, as well as combinations thereof as are presently available or later developed.

Further, the Energy Analytics parts, procedures and ideas as disclosed below can also be applied to other related areas including, but not exclusively, Protective (Relay) Analytics, Building Automation Analytics, Power Quality Analytics and Power Transmission Analytics.

System Overview

Referring to FIG. 1a, the disclosed embodiments relate to an EEM software system 100 that may collect data from various types of EEM data sources and create useful information based on that data. The EEM software system 100 may also allow a user to perform what-if analysis, make changes in their system, and verify results based on the changes. As illustrated, the EEM software system 100 may include an EEM software server 101 that may be coupled with a network 102. The network 102 may include public or third-party operated networks such as: Virtual Private Networks ("VPNs"), Local Area Networks ("LANs"), Wide Area Networks ("WANs"), telephone, dedicated phone lines (such as ISDN or DSL), Internet, Ethernet, paging networks, leased line; Wireless including radio, light-based or sound-based; Power Line Carrier schemes and so forth.

A plurality of IEDs 105 may be coupled with the EEM software server 101 through network 102. The IEDs 105 may be coupled with a load 106. The IEDs 105 are responsible for monitoring and reporting various types of energy data related to the load 106.

The EEM software server 101 may be coupled with a utility 107, a generator 108, a substation 109, and an industrial facility 110 and so forth through network 102. The entities 107-110 may record and report various types of EEM data that is sent to the EEM software server 101. In addition, as used herein, the entities 107-110 should be construed to include various types of computer workstations located at these types of facilities that may connect with and use the EEM software application that is located on the EEM software server 101. As such, as referred to herein, the devices 107-110 should be construed broadly to include various different types of computing devices that may transfer various types of energy consumption data to the EEM software server 101, as well as access the EEM software server 101 to use the EEM software application located thereon.

The EEM software server 101 may be coupled with one or more wireless devices 103. The wireless devices 103 may be IEDs, cellular telephones, or any other device that is capable of communicating wirelessly. The wireless devices 103 may transmit data to and/or receive data from EEM software server 101.

The EEM software server 101 may be coupled with a database server 111. The database server 111 may include a processor 112 that is programmed to interpret and process incoming data from any of the devices or entities that are coupled with the EEM software system 100. The database server 111 may include a database 113 that is designed to store various types of data that may be used by the EEM software system 100. The various types of devices or entities that are coupled with the EEM software system 100 may be designed to transfer EEM data to the database server 111, which may then be retrieved and used by the EEM software system 100. As such, as used herein, the database server 111 should be construed broadly as any type of device that is designed to receive and store data that may be used and accessed by the EEM software application, and as such may be part of EEM software server 101, or may be located on a separate device 111.

EEM software system 100 may also include one or more measuring devices 118 that measure and/or report variables, settings or data sources other than the energy related variables, settings and data sources mentioned previously such as temperature, pressure, humidity and lightning/atmospheric disturbance data, occupancy, internal and external environmental conditions, price, operating conditions, production levels, production schedules, process variables and so forth. Measuring devices 118 may be connected with network 102 and be capable of communicating with other hosts and remote computing systems through some form of communications channel.

In some embodiments, EEM system components may share EEM data with one another. While one illustrative embodiment of the EEM software system 100 is depicted in FIG. 1*a*, it can be appreciated that an EEM system can be scaled out to include additional external sources, or scaled down to include only internal data sources, such as only communications or data within a geographic location or area. EEM data may include, but is not necessarily limited to, Electrical Operation Data such as volts, amps, status, power; Power Quality Data such as harmonics, power factor, reliability (such as number of nines), disturbance data; Consumption Data such as energy and demand; Event Data such as set point actions, status changes and error messages; Financial Data such as energy cost, power factor penalties, revenue data, billing data such as tariffs for water, air, gas, electricity and steam; Environmental Data such as temperature, pressure, humidity and lightning/atmospheric disturbance data; Water Air Gas Electric Steam ("WAGES") data; Configuration data such as frameworks, firmware, software, calculations involving EEM Data and commands; and Aggregated data, where at least one energy management datum is combined with other data points. For the purposes of this application, combined data includes aggregated data and computed data.

Identifying and Tracking of Energy Drivers

Figure 11:
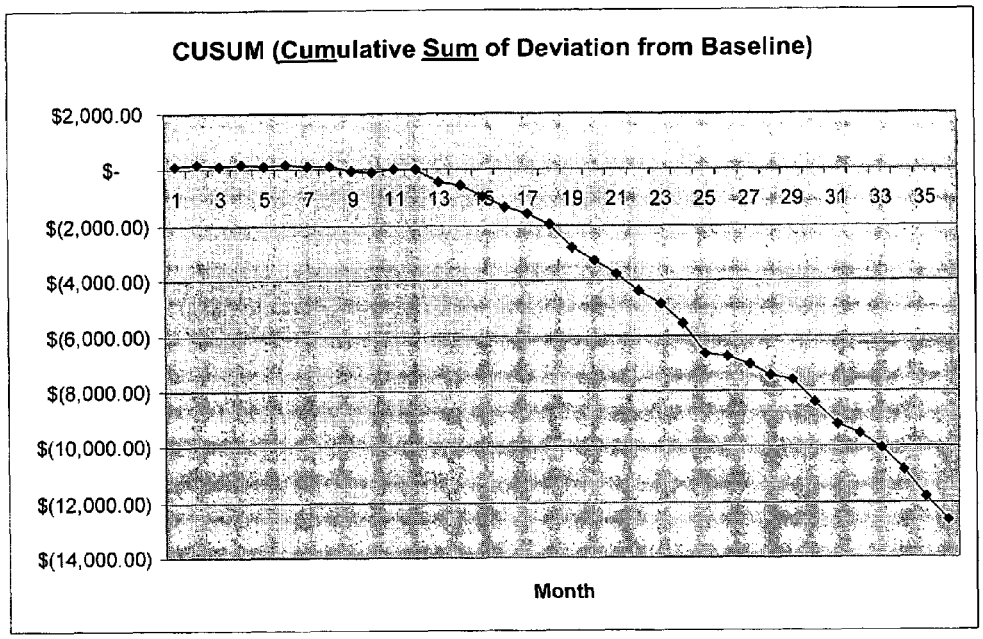
FIG. 11 depicts an exemplary sample CUSUM chart with and without inflection points calculated.
Figure 11:
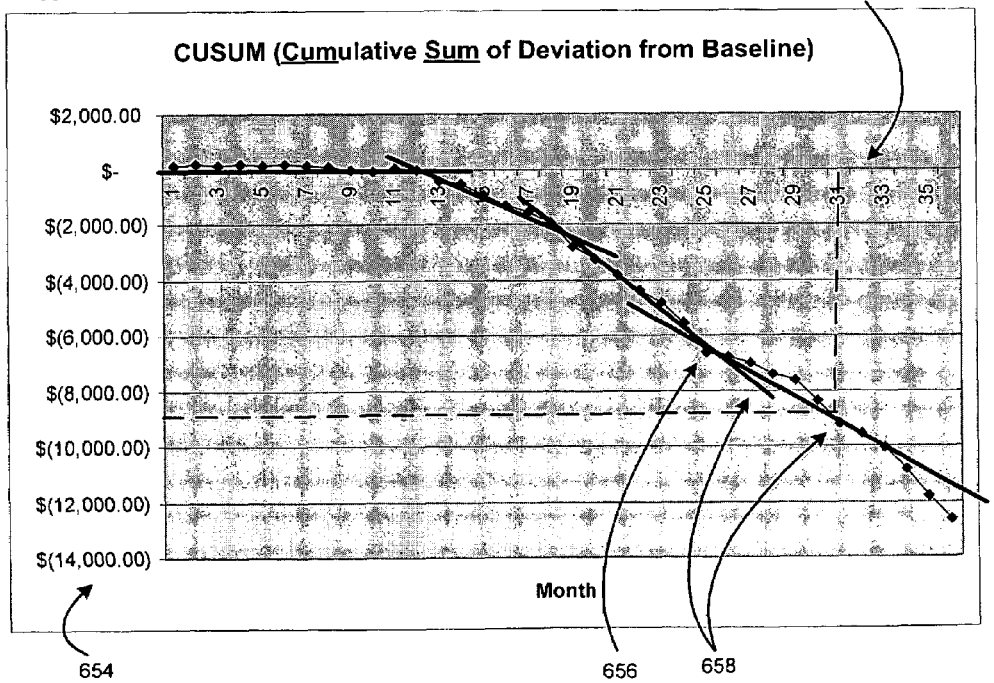

An important part of managing energy use is to identify variables that drive the energy use. Once these energy drivers have been identified they can be used in a variety of ways including to set planning levels, execute energy savings measures, track performance and estimate actual savings. The current state of the art depends on specialized knowledge and manual investigation (perhaps using software such as spreadsheets). One approach consists of providing software that: accepts time series data of a potential energy driver, accepts time series data of energy usage and/or energy cost, examines the two data sets for relationships that can be used to model the impact of the driver on energy use/cost and finally explains the results using actual and sample relationship graphs and plain language descriptions. The software may suggest none to many potential relationships and the user may choose to accept none, any, or all of them for future ongoing use. Once a relationship has been identified, the system will use it as an input to a set of standard energy management tools such as: load profiles, best fit lines, CUMulative SUM of variances ("CUSUM") charts, control charts, saving reports, etc. These resulting automatically generated tools can then be used to manage energy use/cost by maintaining ongoing control and monitoring over the energy driver. The software can use pattern analysis to help identify trends on the various charts, CUSUM in particular, and calculate savings. Now referring to FIG. 11 a typical CUSUM chart 650 is shown. CUSUM chart 651 shows the same CUSUM chart 650 with the automatically generated analysis performed on it. The CUSUM chart 650 651 graphs cost saved 654 vs time 652. In this example, the axis 654 is enumerated by cost, but it could be energy, kWh, or some other unit. The axis 652 is enumerated by days, but it could be some other time range. Inflection points 656 658 on the graphs indicate a change in the system state. Examples are changes in loading, changes in which devices are running, newly installed devices and so forth. The slopes of the lines 656 658 indicate the rate of change in the affect of energy driver on cost. This can be used to predict the amount of savings over time. As will be described below, additional prediction confidence lines can also be drawn on graphs like CUSUM for future prediction/"what-if" derived data. This method can be used to explore other statistical analysis techniques and help validate them. These tools allow a relatively inexperienced person to experiment with identifying energy drivers in their particular environment compared to the previous requirement of detailed system knowledge to do this analysis. Only minimal documentation and expertise are needed to start monitoring and tracking energy savings measures. CUSUM is well known in the Energy Management domain and is also used with statistical process control ("SPC"). To generate a CUSUM chart: (1) come up with some way to predict a dependent variable (say energy used) based on the value of an independent variable (say degree days); (2) make a change that you expect will affect your energy use (such as install insulation to reduce the need for heating/cooling), (3) compare your actual energy used with the value (s) predicted before and after the change, and as time progresses sum the differences, (4) plot them. With this information it is possible to determine if the change you expect to effect the dependent variable actually did effect it and by how much. This can help with decisions whether to increase the rate or amount of changes when combined with other data like the total cost of the changes. Output from this analysis can then be used in other parts of the EEM system to automatically calculate the ROI or other financial measurements.

An energy driver is some variable that affects energy usage. Various energy drivers such as occupancy, weather, internal and external environmental conditions and price are known. However, each system that uses energy is unique from the next, and as a result energy drivers are situational dependent. For example, production levels, production schedules, or process variables may be energy drivers for a factory, whereas occupancy may be an energy driver for a commercial building. Therefore, it would be advantageous to provide an Energy Driver Application 120 that automatically finds energy drivers for a specific system, without the user or owner of the system having to know what the drivers are in advance. The Energy Driver Application 120 can be pre-programmed with a list of quantities that are normally energy drivers and which consumption parameters they can drive and the type of relationship expected. For example, the system can know that it is likely that degree days is a potential driver for heating kWh or cubic feet of natural gas. Alternately, the user can suggest hints of what energy drivers may be, and the Energy Driver Application 120 can do the hard work of retrieving the data and crunching through the numbers. Alternatively the Energy Driver Application 120 may retrieve quantity metadata from any related source. For example, where energy drivers for Building X are being looked for, the Energy Driver Application 120 may search through all non-energy related data for Building X. The Energy Driver Application 120 may be programmed to look first at the quantity data that is more likely to be an energy driver. In some systems an underlying variable may be an unexpected energy driver. For example, there may be a number of temperatures inside and outside a building, such as temperature of a boiler, temperature of a process, outside temperature, and so forth. The Energy Driver Application 120 would look for all data that involves temperature and look for correlations. It may be that some temperatures are energy drivers, and others are not. In another example, the Energy Driver Application 120 may look at process variables, such as gallons per minute of water input, or temperature at a certain part of the process to find if they are energy drivers.

Quantity metadata is information about the characteristics of data in a system, provided so that the software can make intelligent decisions on how to use the data. Examples of quantity metadata include units, source, actual value measured, identification of the thing being measured, and any other characteristics of value. For example, where the data is energy data, the thing being measured might be kilo-watt hours ("KWHs"), British thermal units ("BTUs"), joules and so forth, the actual value might be some number, and the source might be the IED where the data came from. Quantity metadata can be either energy related data or non-energy related data. The original source of the quantity metadata can include IEDs 105, wireless devices 103, utility 107, generator 108, substation 109, industrial facility 110, measuring device 118, and so forth.

The Energy Driver Application 120 then can then inspect the quantity metadata present in one or more databases 113 or retrieved from measuring devices 118 or other data sources for the information that is available for analysis and select or suggest likely candidate relationships. The software can examine the available data for sets of related quantities and select one or more time periods over which to inspect the data for relationships. Selecting an appropriate time period depends to a degree on knowledge of the process and scheduling, so user input may be required for optimal selection. The time interval chosen may be dependent on the frequency of data sampling, which can range from minutes, to hours, to days, to weeks and so forth. Depending on the frequency of data sampling, the interval searched could be days to hours to months, or some other time period, such as shift. Various types of relationships might be modeled or understood by the system: linear, piecewise linear, exponential, and so forth. The implications of various relationships can be programmed into the software to assist the user in interpreting the results.

Using statistical analysis such as linear regression analysis and multivariate regression analysis, the various relationships may then be inspected to assess the quality of each relationship fit. When assessing quality of relationship a correlation coefficient or regression coefficient indicates how close a fit there is between data and the model. A correlation coefficient or regression coefficient is a mathematical description of the value of the relationship between two variables. This can assist in automating the entire process of detecting and using energy drivers.

The Energy Drivers Application 120 may be pre-programmed to not compare ratiometrically linked data. Ratiometrically linked data are different pieces of data that are of the same type and related to each other, such that a change in one piece of data will directly affect the other piece of data. For example, a device measuring a parent feeder and another device measuring a child feeder are ratiometrically linked, as they are both measuring the same type of unit, and the parent and child are directly linked to each other. One way of determining whether data is ratiometrically linked is to organize data into hierarchies, where the hierarchy may indicate that the sources are related in a way that means there is no point looking for a correlation. Where two sources share the same hierarchy, or where the quantity is the same, the Energy Drivers Application 120 may be programmed to not compare the sources.

Referring again to FIG. 1a, the Energy Drivers Application 120 is depicted. The Energy Drivers Application 120 accepts various inputs, including energy usage data, which may come from the IEDs 105, wireless device 103, utility 107, generator 108, substation 109, industrial facility 110, database server 111 or other source of energy usage data. Energy Drivers Application 120 also accepts quantity metadata, which may come from measuring devices 118, data base server 111, or other source of quantity metadata. Energy Drivers Application 120 may also accept a time interval over which to search for energy drivers.

The inputs are accepted via network 102 by an Input Module 122 of the Rate Energy Drivers Application 120. The Input Module 122 is coupled with a Processing Module 124, and passes the inputs to the Processing Module 124. The Processing Module 124 searches through the energy usage data and quantity metadata to determine relationships, and analyzes the quality of the relationships determined. Based on the determined relationships, the Processing Module 124 identifies the energy driver based on the quantity metadata contributing to a given relationship. The Processing Module 124 is coupled with the Output Module 126. The Processing Module 124 transmits the relationships and the identified energy drivers resulting from of the searching and analyzing to the Output Module 126, which is coupled with the network 102 and is responsible for providing third party applications with the relationships. This can be done by transmitting the output to a particular destination, by making it available for access such as on a web server, or via an application programming interface ("API"). The outputted relationships may then be used to manage energy usage to reduce usage and cost. In one embodiment, all identified energy drivers and an associated measure of the quality of the relationship to which they are associated are output via the Output Module 126. The output energy drivers may be ranked or otherwise sorted based on the accompanying quality assessment. In alternative embodiments, quality assessment is performed for each determined relationship and only those energy drivers associated with determined relationships which satisfy defined quality criteria, either statically or dynamically defined, are output via Output Module 126.

Input module 122 and Output module 126 may be separate modules or the same, and can be any suitable software or hardware required by the Energy Drivers Application 120 to accept data from and send data to the Network 102. Similarly, the Processing Module 124 may include sub-modules or logic (not shown) for each of the functions of determining relationships, analyzing relationship quality and identifying energy drivers, as well as, in at least one embodiment, assessing the quality of the relationships associated with each of the identified energy drivers. For example, where the Energy Drivers Application 120 is a self-contained device, the Input module 122 and Output module 126 incorporate all hardware and software needed to connect the device to the Network 102. In one embodiment, the Energy Drivers Application 120 may be implemented as a hardware device, in an alternate embodiment the Energy Drivers Application 120 is a software product with program logic modules that run on a personal or mainframe computer with supporting hardware/software and network connections.

Energy Analytics Products/Services

Figure 5:
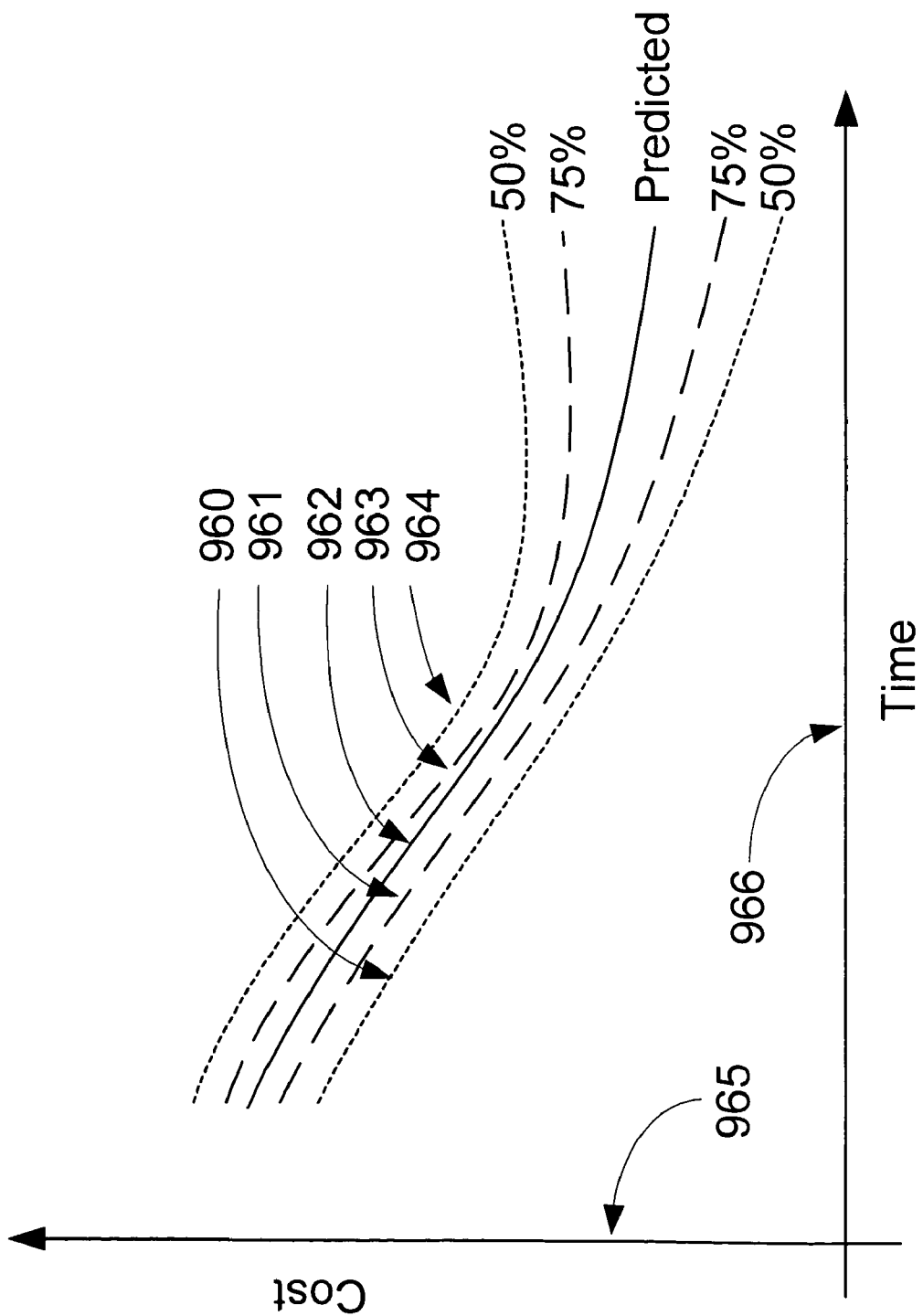
FIG. 5 depicts an exemplary predicted cost analysis with statistical confidence lines.
Figure 12:
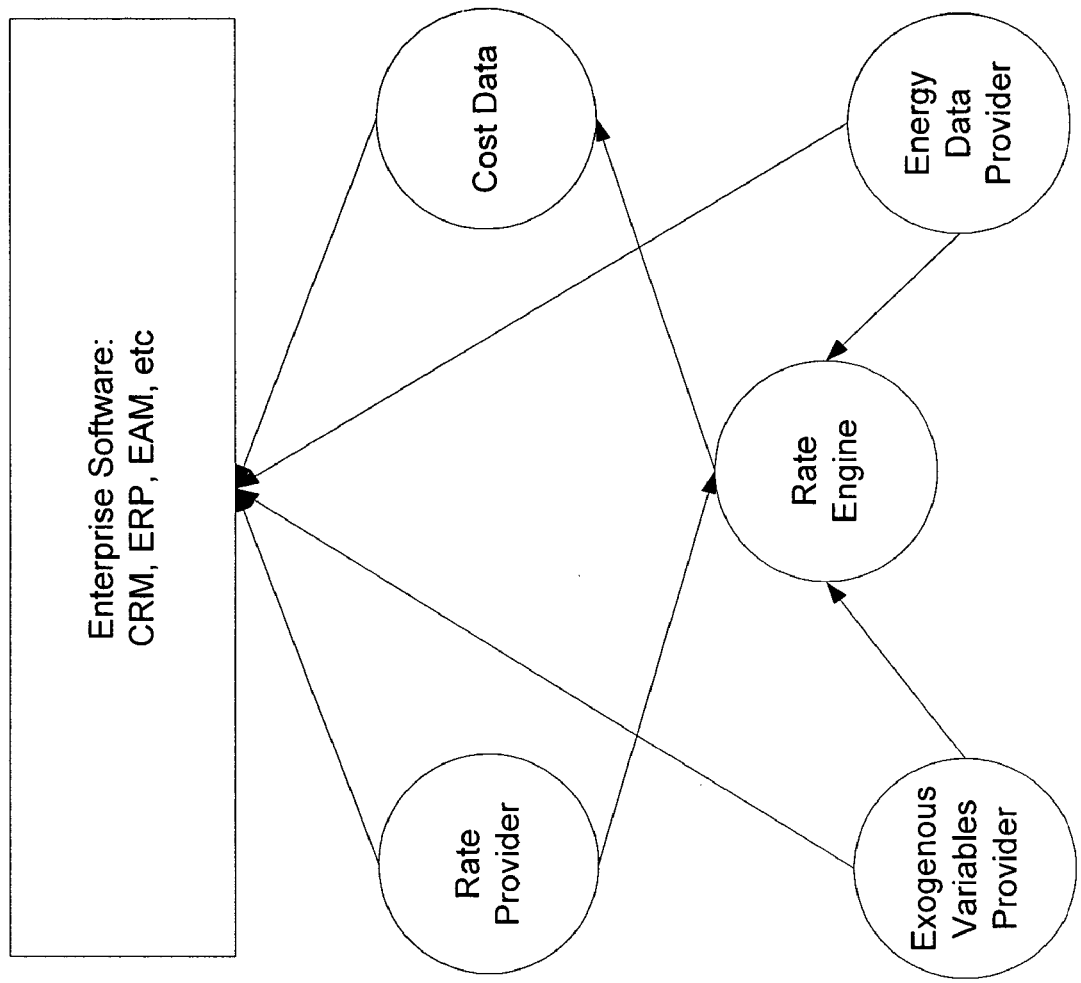
FIG. 12 depicts the possible interrelationships between EEM System components and other Enterprise business software packages.

Historical data from the energy measurement devices may not be the only input to the various databases that are used in profiling the energy management system. Other sources of information like weather, pricing, occupancy, environmental emissions, anticipated consumption and other long term data (past, present and possibly estimated future) including weather, production schedules, inventory levels, Enterprise Resource Planning ("ERP") data, etc. can also be used in making the future predictions more accurate. All these sources of data can be combined together with various algorithms including standard algebraic formulae, fuzzy logic, genetic algorithms, neural networks and fuzzy cognitive maps, etc in an self-learning, expert system that can be tailored to a specific system's requirements. If configured correctly this system can perform just as well as or better than a human expert at identifying relationships between various variables in the system. Using these relationships predictions can be made on how much energy may be required in the future. The expert system can recommend or suggest changes to how the energy is used to help reduce the total cost. With inputs from and outputs to enterprise business systems the EEM system can help optimize the overall business cost not just direct energy costs. Further the system can help to predict the value or profitability of a company based on historical data, eg. using a prediction of temperature levels the impact on operational costs can be predicted and thus on the amount of profit that the company can realize. Some examples of enterprise business planning systems include: Enterprise Resource Planning ("ERP"), Customer Relationship Management ("CRM"), Enterprise Application Integration, Salesforce Automation Software, Operational Support Systems, Business Intelligence, Industrial Process Automation, Building Management Systems and Manufacturing Execution Systems. See FIG. 12 for some examples how the various systems can exchange data. Further, other enterprise systems like MV90, manufactured by Itron, located in Spokane, Wash., USA, can also be used as inputs to the EEM system and also consume EEM information. Additionally, the system can run a statistical analysis using all the input sources and calculate the probability that this is the most optimized system (most economical tariff rate is being used, etc). Once the analysis is completed the results can be displayed in graph form with the "most likely" cost line bracketed with given probability lines to visually show the predicted range of costs. This information can be used in risk analysis and projections in combination with other standard business procedures. Now referring to FIG. 5 a graph of the predicted cost 962 is shown with the confidence lines. The graph is cost 965 vs Time 966. The lower 50% confidence line 960 is the predicted lower bound of the cost with 50% confidence. Likewise the upper 50% confidence line 964 is the predicted upper bound of the cost with 50% confidence. Other lines 961 963 also show the 75% confidence lines bracketing the predicted cost over time line 962.

A further embodiment allows the user to enter an equipment inventory list of the devices (such as motors, generators, lighting, transformers, etc.) that can have characteristics that affect the amount of energy they use and the cost associated with this energy use. Possible modifications along with the resultant affects on the power system can also be entered. Cost information for various modifications and desired payback period can also be entered into the EEM system. The software can then automatically monitors usage patterns and tariffs and informs the user if/when the ROI for a particular piece of equipment is within the desired payback period. Many businesses have criteria for payback period before outlaying the capital necessary to reduce energy consumption and/or energy cost. The software can use the dynamic operating conditions within the system to make the ROI calculations rather than a static method based on a snapshot of data at a particular time. This automatic, dynamic method can show the historical trend for the various cost elements of the analysis and provide a projection based on this. This automatic dynamic method can be used in 'set and forget' mode. It automatically informs the user of the most economic choice for the equipment entered. Further, by using "what-if" scenarios the user can try different usage models and see how the predicted ROI will change and how it impacts other costs in the system. Further, on significant EEM system events the system could suggest improvements to the system by adding additional equipment or devices that could have mitigated the damage or protected the system from the event. The system can then provide an analysis of the cost of the event, cost of the additional equipment and the cost savings assuming that the equipment was present for the event.

The energy measurement devices supplying raw or partially processed data can provide periodic sample data for use in the energy analysis. Normally this data is not saved for long periods of time due to the vast amount of data that the devices can collect. A further analysis technique that the EEM system can employ is to apply signal analysis like FFT, DFFT, wavelet transforms on the sample data to derive additional information from the data like trends and period fluctuations in the measured data. The sample data and derived data can be useful to perform analysis functions that the original measuring device may not have been able to perform due to limitations in processor power, memory or other factors.

Automated Expert Control of Energy Cost Management

Energy costs vary over time due to changing loads, changing market conditions or changing types/sources of generation. Companies want to be able to minimize these costs to increase their overall business profits. One solution to this issue is to engage in contracts involving energy consumption and production rights. The traditional approach is to have a person monitor the various factors that control these costs and manually take steps to reduce or increase energy usage depending on the current situation. This tends to be an expensive solution and only large companies can normally afford it. For the medium and small companies less active involvement is typical and thus they can be less efficient over short term fluctuations in either load or supply costs. A better solution is to automate this procedure using an expert system to automatically manage the various factors that influence the final energy cost. Using an expert system with general rules to follow will help optimize the total energy cost over time with minimal involvement by personnel on a daily basis. Rather than trying to optimize a control system that can make recommendations or decisions that optimizes profit, an expert system can make decisions that are close to optimizing profit but are simpler and less expensive to build and maintain. Expert systems can be built using a knowledge base that optimizes profits as well as a non-expert system—it depends on the problem and the amount of effort developing the system. It is frequently worth building expert systems using fuzzy logic that only approach an optimal solution because fuzzy systems are inherently simple and easy to compute and sometimes a system that computes an optimal solution can not be easily calculated. The expert system is based on rules of thumb that match the facilities characteristics. Initially writing these "rules of thumb" can be easily done by someone familiar with the expert system shell and a highly trained programmer is not required as in a fully optimized system. Since the rules are easier to write, this step can progress faster compared to writing the rules for a traditional implementation. Obviously the inputs supplied to this system will come from a variety of sources including energy meters, other cost engines, utility bills and tariff price sheets, or even direct entry by operators of the system. The method of transferring the data can be diverse. Some examples of the types of rules that can be implemented are: "If the utility instructs to curtail loads then curtail loads", "If electrical energy bought is much more expensive than electric energy generated from our generators then generate our own power", "If we are generating more electrical energy than we require then sell the excess to the utility", "If electrical energy is very expensive now and is cheaper later, curtail loads and buy energy later", "If curtailing load will result in a damaged production run then do not shed loads now but stop taking new work into the production line", "If loads need to be curtailed then reschedule the process when loads do not need to be curtailed". Rules in the knowledge base may be crisp or fuzzy rules (fuzzy logic). Some of the examples of rules listed above are crisp and others are fuzzy and some conflict or contradict each other. Fuzzy logic is able to resolve these issues and convert linguist terms like "electrical energy is expensive" to fuzzy values and rules that the inference engine can process.

Instantaneous Cost Engine

Figure 1B:
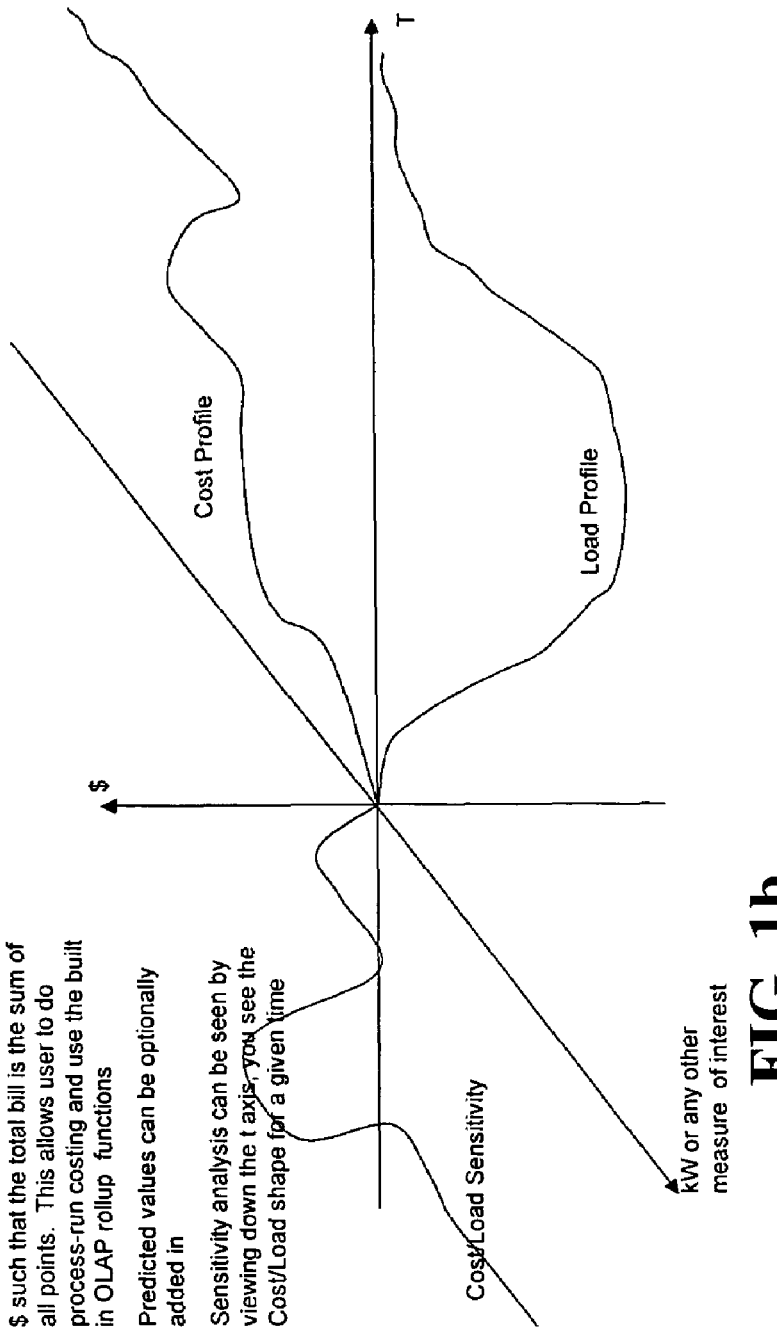
FIG. 1b depicts an exemplary Instantaneous Cost Engine output.

Current energy rate engine technology uses a procedural approach. Generally, an energy bill is calculated by retrieving energy and rate data from various sources and applying a set of programmatic routines on the data. Often, the rate engine takes multiple passes through the data. The Instantaneous Cost Engine ("ICE") takes a completely different approach. It is based on On-Line Analytical Processing ("OLAP") and declarative programming concepts rather than procedural ones. The most significant differences are a) cost data is provided on an measurement interval basis rather than a single total for the bill period, b) interval cost data can be aggregated and disaggregated by any dimension of interest and c) an energy rate is modeled as a series of simple relationships rather than a complex set of programmatic routines. Providing cost data on a measurement interval basis allows costs to be allocated and predicted across any dimension of interest. For example, once the interval costs for a car assembly line are understood, it is possible to allocate costs accurately to the processes for a specific model of car even if the process spans energy bills. Interval cost modeling also integrates seamlessly with real-time energy pricing ("RTP") so that the user can analyze standard energy contracts and RTP costs together. Because the design of the ICE follows the OLAP model, it is easy to apply multi-dimensional analysis to the interval cost data. This allows energy costs to be treated the same as any other business costs and integrated into the financial analysis and planning tools. Techniques such as data mining, forecasting, etc all become possible using industry standard tools. Examples of dimensions that can be analyzed include: geographical location, cost center, feeder, process run, shift, Time-Of-Use ("TOU") rate, etc). Modeling energy rates as a series of simple relationships allows for very simple what-if scenario functionality. Questions that are currently very difficult to answer become simpler to answer. Example include: "How does my bill change if I move this motor over to that feeder?", "How does my bill change if I put this motor in that building?", "What is the cost of producing one more car on this assembly line?", "How do the energy bill change if the tariff being used to calculate the energy bill is changed?". Now referring to FIG. 1 the output of an ICE is displayed. The figure assumes that the other dimensions (geographical, feeder instance, bill period, etc) have been fixed. The ICE can allow you to enter the various constraint relationships and intelligently control and plan loads to minimize costs. Alternatively, these same concepts can be applied to operational aspects such as power quality, etc. For every cost based idea there is an operational equivalent.

Inference Engine for ECA

Energy consumers are periodically billed for their energy usage based on typically complex contracts that depend on a variety of factors including: demand, time of use, date of usage (day or week or season), amount of usage and other parameters. Since typically these parameters are all independently varying it can be very difficult to predict the amount of the bill at the end of the month. Manually calculating the bill is prohibitively expensive in most cases because of this complexity. This normally means that the customer has no way to independently verify the energy bill from the utility. A solution to the problem is to break the contract terms down into declarative rules/predicate logic and store them in a knowledge system or in a logical language like eXtensible Stylesheet Language Transformations ("XSLT") or Prolog. Instead of having a software engineer develop an imperative system based on these rules, a technician can decompose the complex rules contained within the contract into simpler declarative rules and enter them into an inference engine. The inference engine then uses these rules with raw data to calculate an energy bill or an approximation of the real energy bill that is calculated by some other means, perhaps by the energy supplier. Further, most inference engines can work with raw data that is partially incomplete or missing and make a "best guess" answer. Using real time data, the inference engine can run and predict the likely cost for this billing period allowing the user to adapt the energy usage profile to lower or increase costs as appropriate given the current price conditions or power quality by shedding loads and/or starting local generators to supply additional energy at a possibly lower cost than purchasing it externally. Further, using this inference engine, past events can be analyzed to determine how they changed the final energy cost and the Return-On-Investment ("ROI") of the overall system and parts of the system. This can be used to determine why costs exceeded the expected amount or the contracted supply. Alternatively if costs were reduced the amount of energy saved can be calculated and displayed. Alternatively, "what-if" scenarios, using historical data to help predict future usage, can be posed to test how the energy costs changes given different situations. This is called a forward or backward inference chaining engine. An alternate embodiment of this inference engine can be in multiple, separate pieces of software that exchange needed information between them in a possibly secure manner. With information on the user's system further analysis can be performed with the goal to increase the accuracy of the final resulting calculations. This information about the customer's system can also be encoded using declarative/predicate rules and stored in the knowledge system. A further embodiment may involve the aggregation and dis-aggregation of multiple sub-user's rules to allow for sub-billing. This can be useful for billing individual departments of a company (or to different tenants in a commercial building) separately for their energy usage and when these individual entities have differing usage patterns that can cause changes in the overall aggregated bill. Further, these rules do not necessarily have to be executed on a dedicated computer but can also be executed on the metering devices themselves partially or fully. This is especially valuable if the metering devices are able to gather energy parameters from other metering devices. This can allow decentralized automated control of parameters that contribute to the cost of energy. Alternatively using XSLT, prolog, javascript, and other technologies, portions of this scenario analysis can be done on websites, web services, or in web browsers where some of or all of the software is delivered to the browser from a web server. Some or all of the web services may use secure protocols for communication.

Disaggregation of Loads

In an energy management system each load normally needs a separate meter to measure the energy consumed by that load. This can get expensive for a large number of loads. In a common situation a single energy feed to the building may supply three phase motors as well as single phase lighting loads. If the motors and lighting loads can share a single meter to measure the energy consumed by both loads then there is a net cost savings for the meter itself, installation costs and all the ongoing support/maintenance costs. A solution to this problem is the ability to disaggregate the loads from a single meter monitoring multiple downstream loads with discernable differences in the load characteristics. Many loads have differences in one or more factors that define the energy system. Examples include power factor, harmonic loading, phase imbalance, some periodic fluctuation in one or more parameters, customer profile differences (two customers have different working hours/run loads different times) or other temporal factors (changes in usage patterns over time). With a load inventory but not knowing what loads are active or only partial knowledge of the active loads the EEM software or energy measuring device itself can calculate the ratio or percentage of the total measured load each of the individual devices are consuming. An example is if it is known that a three phase motor is on phases A, B and C, the motor load is balanced and a lighting load is on phase A then the percentage of the total load consumed by the motor and the lights can be calculated. A method to determine the ratio of the individual loads of the total load can be implemented using multiple linear equations with various energy related parameters as variables in the equations that calculate the energy used for each load. Additionally the total load is the total of all these equations. Solving this set of linear equations can then give an approximation of what loads are present and possibly how much energy they are consuming at the present moment. This method relies on the fact that the loads have some orthogonal characteristics (and not all loads fulfill this criteria). If the loads have similar characteristics then additional information will be needed to distinguish between those loads and determine the ratio of each load relative to the other loads of the total energy usage. An extension this idea is to use a learning algorithm to empirically determine the equations that describe each load. Each load needs to be measured individually including the aggregate load for a period of time. Using this information an equation can be derived for that load. This is repeated for each load downstream of the aggregating metering device. Once all the loads have been measured then the complete set of equations can be used to calculate the final ratio of the various downstream loads. The learning algorithm may be a neural network, genetic algorithm, or a neural or genetic algorithm that adapts a fuzzy system. Once the disaggregation formulae have been decided by the learning system the extra instrumentation can be removed and put to other uses. Further, if loads can be characterized by studying their behavior, a system model can be created and the learning algorithm can be applied to the simulation to learn how to disaggregate loads. Alternatives to measuring directly include deriving and programming the formulae using information obtained from datasheets and technical descriptions of the individual devices. This concept can also be applied to higher level feeders from the utility. It is applicable to sub-feeder, service entrance and distribution level feeders.

Automatic Energy Calculation by SCADA Program

In many cases energy measuring devices are removed for maintenance or replacement. During these periods the energy flow is commonly not measured by any metering device. Since the energy usage is not being measured and the measuring device is normally used for generating the billing data to the customer, the supplier of the energy is uncompensated for the energy used during this period. The utility will either not charge for this unmeasured (ie. "free") energy or the energy usage will be manually calculated or estimated by the meter technician based on the usage immediately before the measuring device was disabled. This works reasonably well for short periods but for longer periods this will progressively become more inaccurate as the actual loads change. A useful improvement to existing energy management systems is the ability to automatically calculate an estimate of the energy used based on past usage history, trends before and after the energy device was replaced and other factors that may influence the energy used during that period. Overall this energy usage estimation can be much closer to the actual usage. By increasing the accuracy of this estimation technique the utility will not only reduce the cost of the down period due to unmeasured energy but also eliminate the manual, error prone step of calculating the energy usage.

Distributed Enterprise Rate Engine

Figure 2:
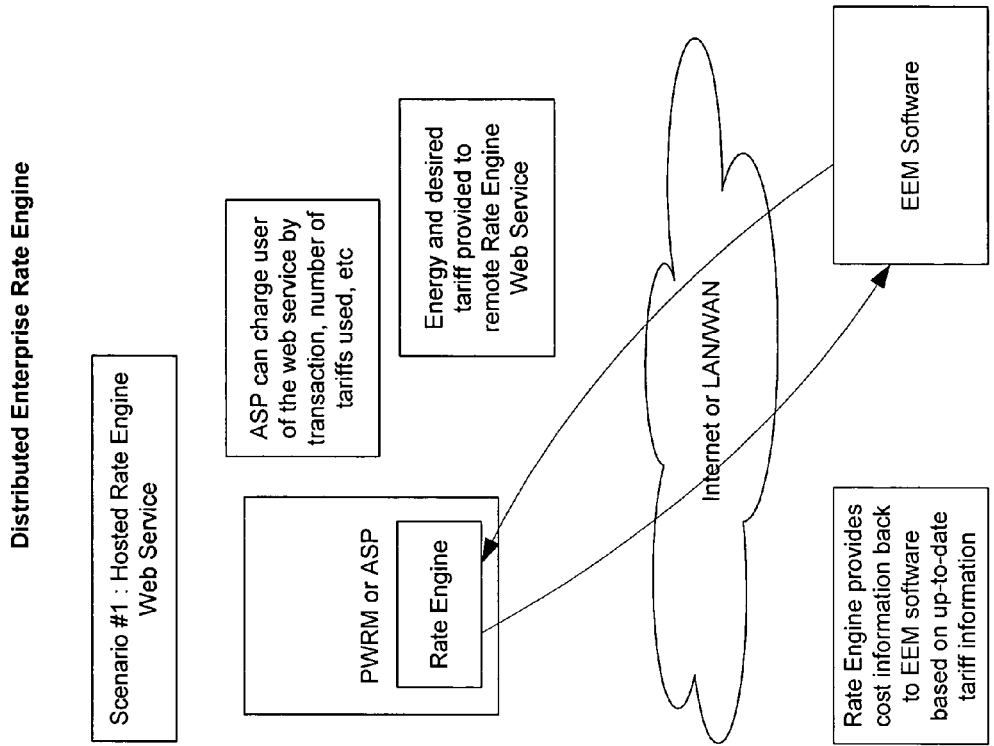
FIG. 2 depicts an exemplary scenario where an EEM System requests and receives tariff information from a Distributed Rate Engine.
Figure 3:
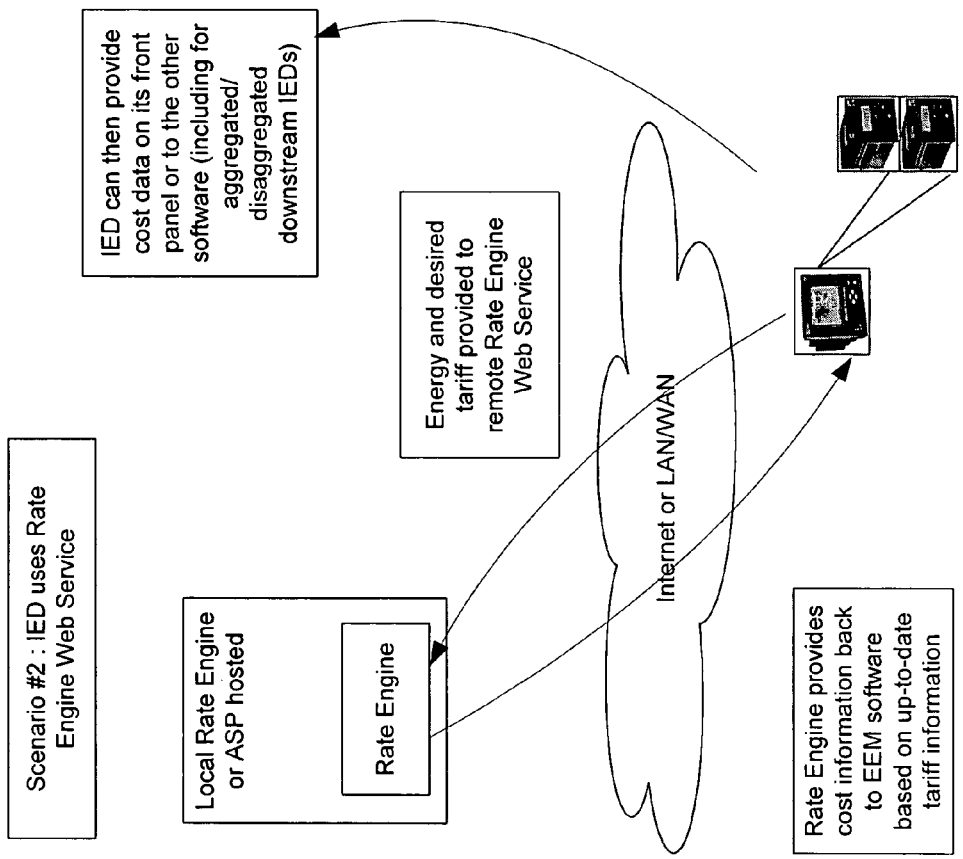
FIG. 3 depicts an exemplary scenario where an IED requests and receives tariff information from a Distributed Rate Engine.
Figure 4:
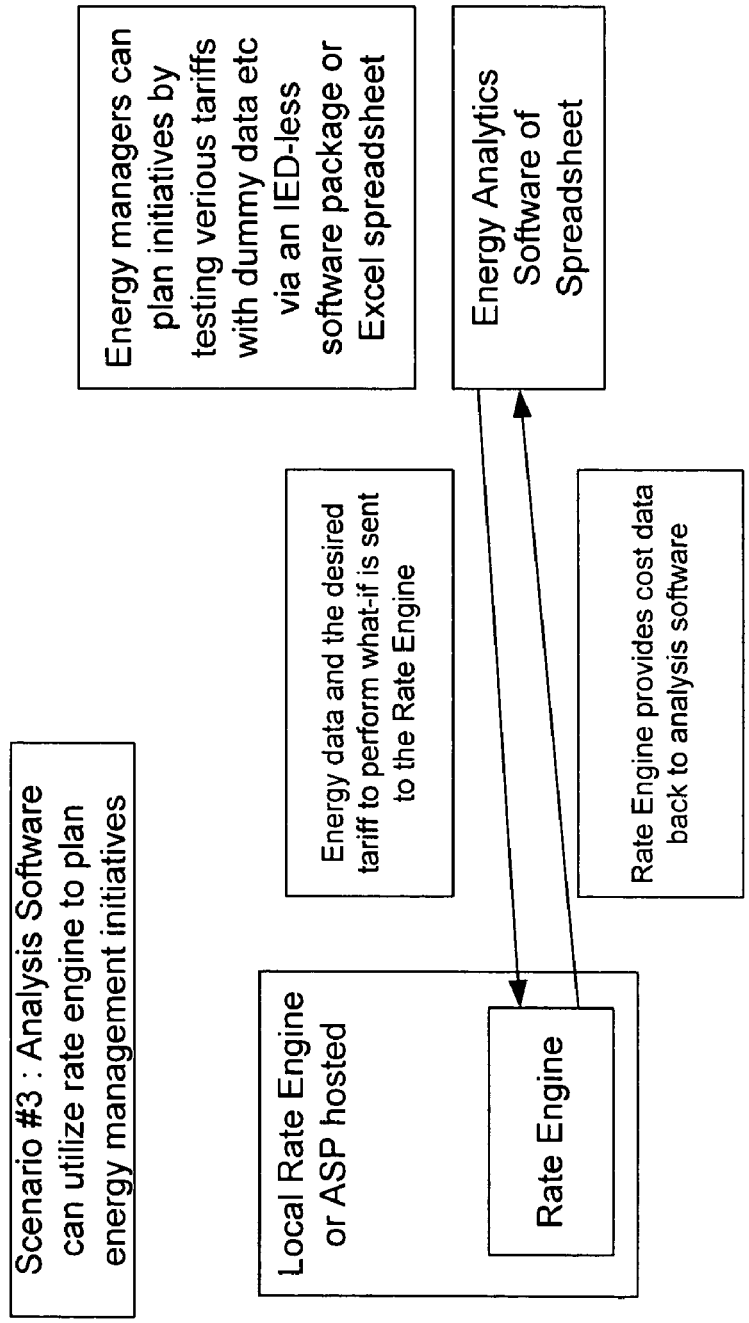
FIG. 4 depicts an exemplary scenario where software package like a spreadsheet or Energy Analytics requests and receives tariff information from a Distributed Rate Engine.

As part of the EEM system there normally is some way of converting raw usage information into cost information embedded directly into the EEM system. A rate or tariff engine is a set of software components than can convert energy data and Time-Of-Use data (and possibly other relevant inputs such as weather/temperature etc) into cost/billing information. This resulting information can be used for Energy Analytics and in other EEM systems. To accomplish this, the rate engine needs to implement a host of utility tariffs to accommodate the needs of many users. The tariffs define the cost of using specific amounts of energy on particular days and times of day in combination with other factors. In commonly available systems the rate engine is an integral part of the EEM software package and can not easily be separated. The disclosed embodiments separate the rate engine from the main EEM software package into a standalone package that can be queried from the main EEM software package as well as from other pieces of software and firmware as needed. Additionally the interface to query this information can be based on standard Internet protocols to increase the interoperability between the rate engine and the other software and firmware packages. The rate engine can reside on a different computer from the EEM software, possibly even managed by a different company like an application service provider ("ASP"). Additionally by separating the rate engine from the EEM software, different types of devices, like an IED, can query the rate engine. The IED can query the rate engine to determine costs (including the aggregation and disaggregation of loads of downstream devices) and make such data available via its front panel or to third-party. Further the IED itself could download the tariffs to run on its own rate engine or for distribution to other IEDs or software packages. Alternatively other analysis software or spreadsheet software can take advantage of the rate engine for planning purposes. The ASPs can host the rate engine to ensure that the most up-to-date tariff information is being used and the burden of upgrading numerous customer instances of the rate engine is lessened. ASPs can also elect to expose the rate engine as a service offering (pay-per-use, pay-per-tariff, etc), or just collect statistically usage information. Additionally, the tariffs can be automatically pushed to the customer, user can be charged by access, leased for specific time periods, for use in "what-if" analysis or as a library of tariffs that people can pay for access. See FIG. 2-4 for some examples of use.

Incremental Rate Engine

Combining the rate engine calculations and the database into one application can result in performance and scalability improvements over the current methods of processing this data. By performing the rate calculations in the database itself, possibly as the data is entered into the database, reductions in the required processor power can be realized compared to the traditional approach of performing the operations at data extraction and report generation time. This method will increase the speed that a report can be generated on demand, thus responding to the user's requests quicker. This will also allow a "bill to date" report to be easily generated containing the current up to date cost of using energy over this billing period. The method of performing these functions can be performed using standard database engine facilities (stored procedures, functions, SQL, tables). Billing data is submitted to the database via a stored procedure ("sproc"). This sproc inserts the billing data into tables in the database. It also calculates as much rate information as can be determined at that point in time. For instance, if a given time of use rate was active, the database can pre-calculate some rate related information based on the timestamp of the billing data. When a user wants to calculate the final energy costs, the billing data in the database is further processed (if necessary) and the results are presented as a report. Standard database reporting tools can be used. As the nature of the billing data lends itself to analysis using OLAP technology, where ever possible the rate engine may use OLAP to further improve its ability to calculate energy costs or enhance the ability of the user to extract meaning. By using this method, calculations like calculating the peak demand can be done for each billing period. Calculating the peak demand for the year can be made simpler due to the fact that less data is retrieved from the database (only one point per billing period required instead of all the individual data points). Energy, demand and other interval parameters can be stored and the tariffs for each interval can be pre-calculated on entry as another column in the database. Most tariffs are based on one or both of energy and demand interval data and additionally, in most cases, when the energy was used or demand peak was set. Further, the database can validate the data as it is being entered. If the data is "questionable" in some way then it can be flagged for further analysis and review later. Alternatively, any data marked in this way can be excluded from other automated analysis to avoid possibly distorting the analysis results. Further, different rates may require quantities, such as power factor and demand, calculated in different ways. The goal of the rate engine is to be able to use the proper quantities as specified by a particular rate. In order to accomplish this, the database storing the historical information may need to contain these quantities. Many bills can then be calculated, or compared without the meter having knowledge of the different rate requirements. The data warehouse loading system is what will handle the process. In order for the system to accomplish this, it must be aware of the quantities needed to fulfill the rates' needs and derive them accordingly. The rate engine will also need to be aware of what the data warehouse does and does not contain in order to alert or trigger the calculation or otherwise obtaining the required historical information. This includes historical information derived by using different formulas. An example is power factor formulas differing from utility to utility. For instance, one utility may calculate power factor by dividing kW by kVA. Others may calculate power factor by taking kWh and dividing by the square root of the sum of the squares of kWh and kVARh. This facilitates using measuring devices with differing, or lesser capabilities and possibly allowing for simpler meter commissioning. For people needing to review the historical information which contributed to their bill, such as derived power factor, the warehouse needs to be populated with this information. This is accomplished by the system having knowledge of the rate and formulas for each derived quantity. The system can use this knowledge to populate the derived historical data into the warehouse.

Web Service for Transient Analysis

Commonly available metering devices today are capable of measuring transients and storing related information. These transients or other critical events can then be reported to computers running software using standard web based protocols for further analysis and characterization. The formats that these transients or critical events can be sent in include typical formats (COMTRADE, ION, etc) as well as MIME or DIME attachments or XML Infoset representations contained within a SOAP message. The messages can be sent through the internet or other networks possibly using HTTP, SMTP and SOAP. The destination for these events can be a classification service, either a software program for automated analysis or a human to make a decision. If the software classifier has a low confidence in its classification of a particular disturbance then the disturbance can automatically be forwarded to a person to make the classification. Once a disturbance is classified then a human readable analysis report is sent through the Internet or other network to parties interested in the disturbance analysis. Further, a machine readable analysis report is also sent through the Internet to an Energy Cost Analysis ("ECA") module. The ECA module can use the report to calculate the cost of the disturbance to any parties who have a financial contract affected by the disturbance. Alternatively, the ECA module can also tie into other software modules like Enterprise Resource Planning ("ERP") or production planning systems as previous listed to help determine the cost of the disturbance to the energy consumer affected or output the cost into other enterprise software packages.

Monitoring Reliability and Efficiency of Energy Systems

Analyzing the reliability of a particular component, process or an entire energy system provides important metrics that can be used for cost/risk analyses. Being able to assess the reliability is an important factor for the optimization of such things as contingency planning, maintenance schedules, spare parts management and others. The system calculates reliability indices based on equipment specifications, energy system configuration, operating history and the current operating conditions. Information about the energy system configuration, such as which equipment is installed in series or parallel, can be entered either manually or through some automated process. Also, reliability information about individual components such as transformers, motors, and drives can either be entered or derived automatically over time through statistical analysis of recorded operating parameters for these components. The component specific information can include measures such as mean time to failure, hazard rate curves, or failure distributions. Other examples include the operating conditions over time or at critical instances and the cumulative effects on the component reliability. Circuit breakers, for instance, are sensitive to where in the current the breaker is closed. If the breaker is closed when little or no current is flowing there is much less component damage when compared with closing the breaker when high current is flowing through it. The system can monitor and log these conditions and use this information in calculating the total "wear" of the component and indirectly the system as a whole. The component specific information is then combined with the energy system configuration information, historical information recorded by the proposed system and current near real-time measurements such as temperature and loading factor to calculate the results. The historical information can include things like number of On/Off cycles, extreme operating conditions, or total time of operation. The results are available in near real-time and provide a true representation of current operating conditions. The results can be displayed, recorded into a historical database, and further processed for analysis or alarming. One possible application is to identify equipment deterioration as well as improvements and to measure the effects of system configuration changes on the reliability. As the predicted reliability drops over time due to "wear" the system can automatically notify the users that preventative maintenance is required. This can be particularly useful for mission critical applications such as hospitals or data centers. This can increase the time between maintenance service events to help reduce cost and system downtime.

The overall efficiency of the system or sub-parts of the system can be an important metric. For example the software can monitor the loading of transformers and display an approximation of the efficiency based on generalized or equipment specific information. For a whole process, the software can monitor operating parameters (both electrical and non-electrical) and calculate the compound efficiency of the process based on the efficiency of individual process components. Using this information further analysis can be done to determine how the efficiency (and reliability) can be improved by changing system design or process parameters. Increases in efficiency can also be investigated using the model of the existing system as a base and posing "what-if" questions. Adding/deleting or rearranging parts of the system can change the overall efficiency and reliability of the system. Changes in the measured efficiency can trigger an alert notification to be generated and investigated further. These changes can be due to many causes including the described load inventory changing unexpectedly, equipment deterioration, physical changes of hardware in the system, etc. Collection of efficiency and reliability ratings over time can be used as inputs in other statistical models.

Energy Management Notification Systems

A critical part of an energy management system is the notification of significant events in the system to the correct people so the events can be dealt with quickly. Normally this is a laborious effort involving a number of steps that require some understanding of both the notification system and how the control variables must be monitored. The software can automatically create a notification event as the user is setting up the system and identifying control variables, their relationships in the system and the allowed limits of the control variables before they are considered out of specification. Once the system is setup the user can then select from the automatically created notification event list one or more of the events to subscribe to. Once subscribed the user will be notified when the variable(s) get out of the allowed range. In combination, the software can use Microsoft Notification Server among other similar technologies to handle the actual notification to user of the system. This can be a significant improvement over the existing means of implementing the notification of significant events to users and increases the likelihood that the users will be notified of important events in a timely fashion (and important to that specific user as well). The traditional approach is to setup the system without regard to events that users may be interested in. Once setup then the user manually adds events and their limits to be notified on. This step can be error prone as the specific parameters and limits can easily be forgotten or mistakes made when entering them into the system at this stage. The proposed system can significantly automate this step so the parameters and their limits do not need to be entered twice. The concept of control variables and control charts is a tool used in energy management. A control variable is a value that is monitored (and possibly logged) to exercise control over the use of energy. Alternatively, the control variable can also be calculated using other variables measured in the system. A control chart shows the value of this control variable over time and includes thresholds or bounds (lower, upper, or both) that the control variable must stay within in order to achieve the goals of the energy management measure. A notification service is used to notify a user (via email, pager, SMS, cell phone, etc.) when a certain set of conditions are true (the price of a energy commodity rises above a certain value for example.) A subscription links together the user, the item of interest, and the conditions under which the notification can be sent. Once a control variable and control limits have been established, a subscription or subscription template can be created that allows users to quickly and easily subscribe to be notified when the exceptional condition(s) occur. The details of how to structure and configure the subscription template will differ depending on the notification system.

Aggregation/Consolidation of Historical Data from Independent EEM Systems

A necessary feature of an EEM system is the ability to query historical data to produce enterprise-wide reports. System size, geography, network availability and information sensitivity are some of the factors that often necessitate the partitioning of historical data into multiple databases that may not be readily accessible for reporting. In many cases it is necessary to bring this information into a central database for further processing and generation of reports. Some of the measuring devices themselves can also be considered databases that contain EEM related data. There are two main means to accomplish this centralization of data. The first means is each individual database pushes the data to the central location at some interval. The end of these intervals can be triggered by the end of a reporting or demand period, communications channel availability or some other high priority event. The second means is the central database periodically initiates communications with each independent database source when they are available. This can be a temporary communications link or even a physical shipment of data in electronic or other formats. In either case the data can alternatively be the original data collected from the original metering devices or may have been first processed in some way on extraction from the independent database(s). Typically it is unnecessary to replicate all the data from each individual metering device in the central database. A reporting feature and the data transformation services can be used to produce data summaries for the individual "partitions" or databases that can include selected data and pre-aggregated data. This can help to reduce the amount of data that needs to be transferred, reduces the amount of data redundancy that can be present as well as supporting different output data formats. This method of processing and aggregating the data also supports a hierarchy of database sources that progressively get more abstract and high level the higher up the tree. At each stage the data is reduced/aggregated further until at the top level of the hierarchy overall general values of the energy usage emerge yet all the raw data can be still available for more detailed queries in the original device databases.

Improvements to Energy Management Data Storage Systems

Figure 6:
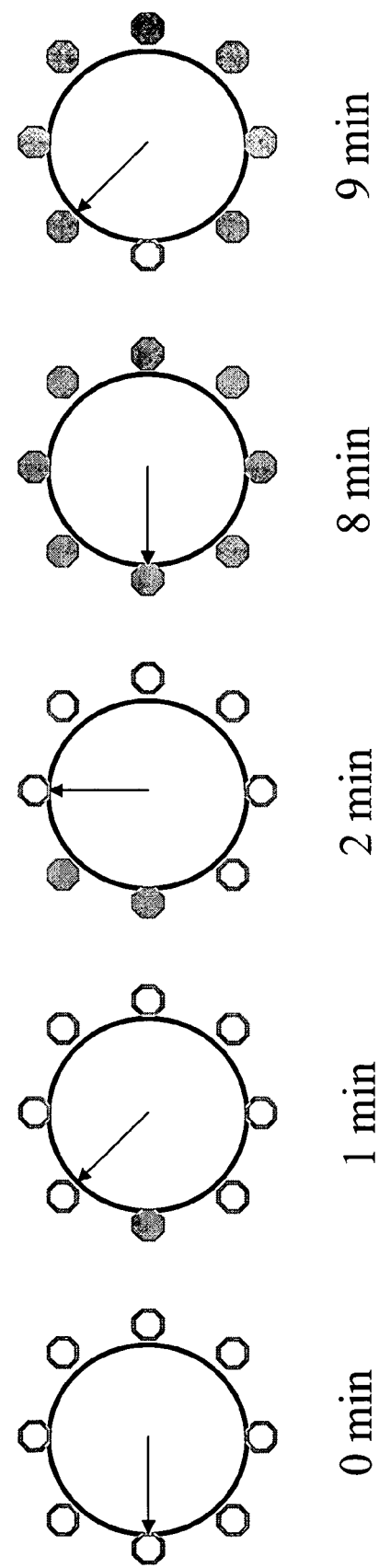
FIG. 6 depicts an exemplary single circular data storage.
Figure 7:
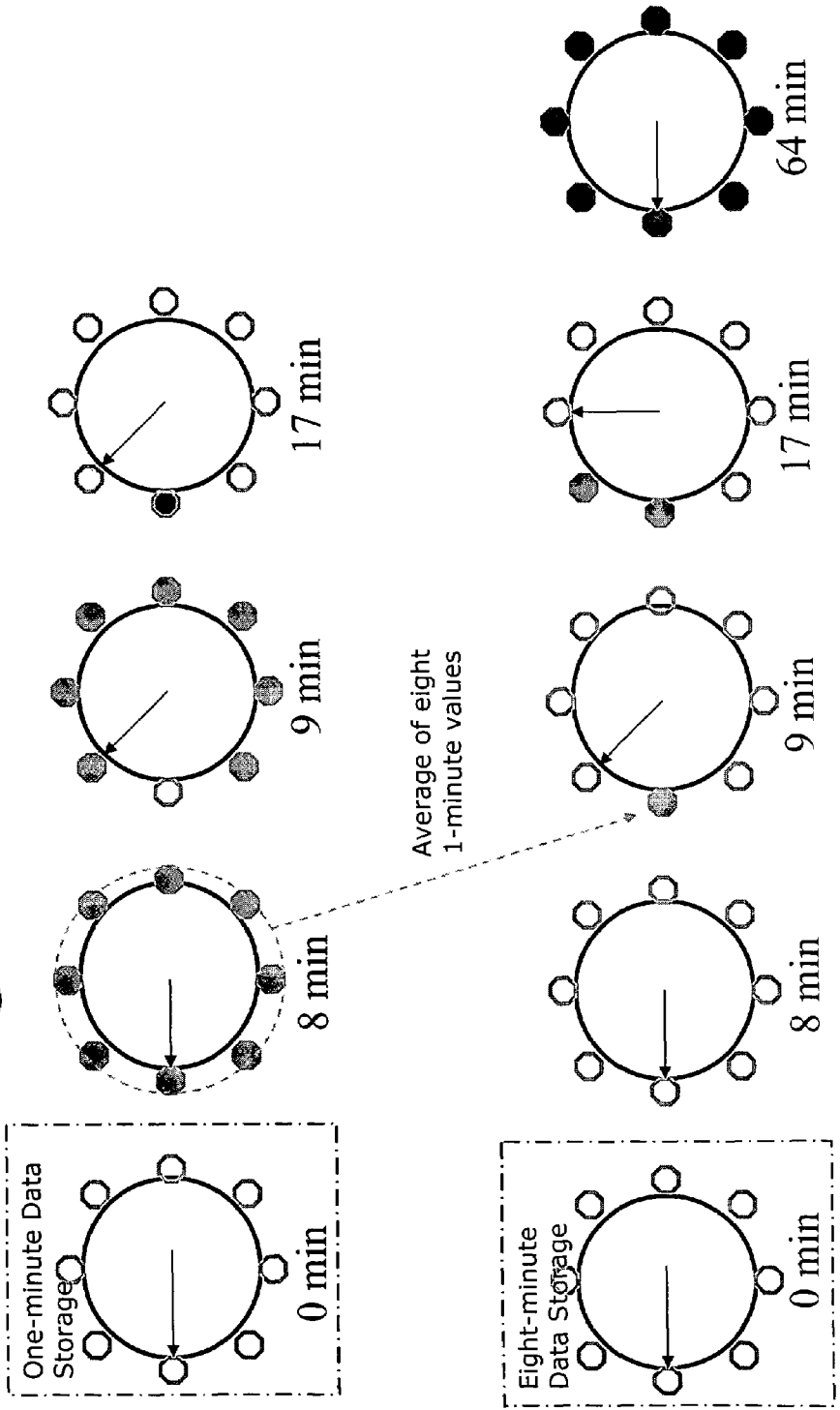
FIG. 7 depicts an exemplary cascading data storage consolidation from one circular data storage to another circular data storage.
Figure 8:
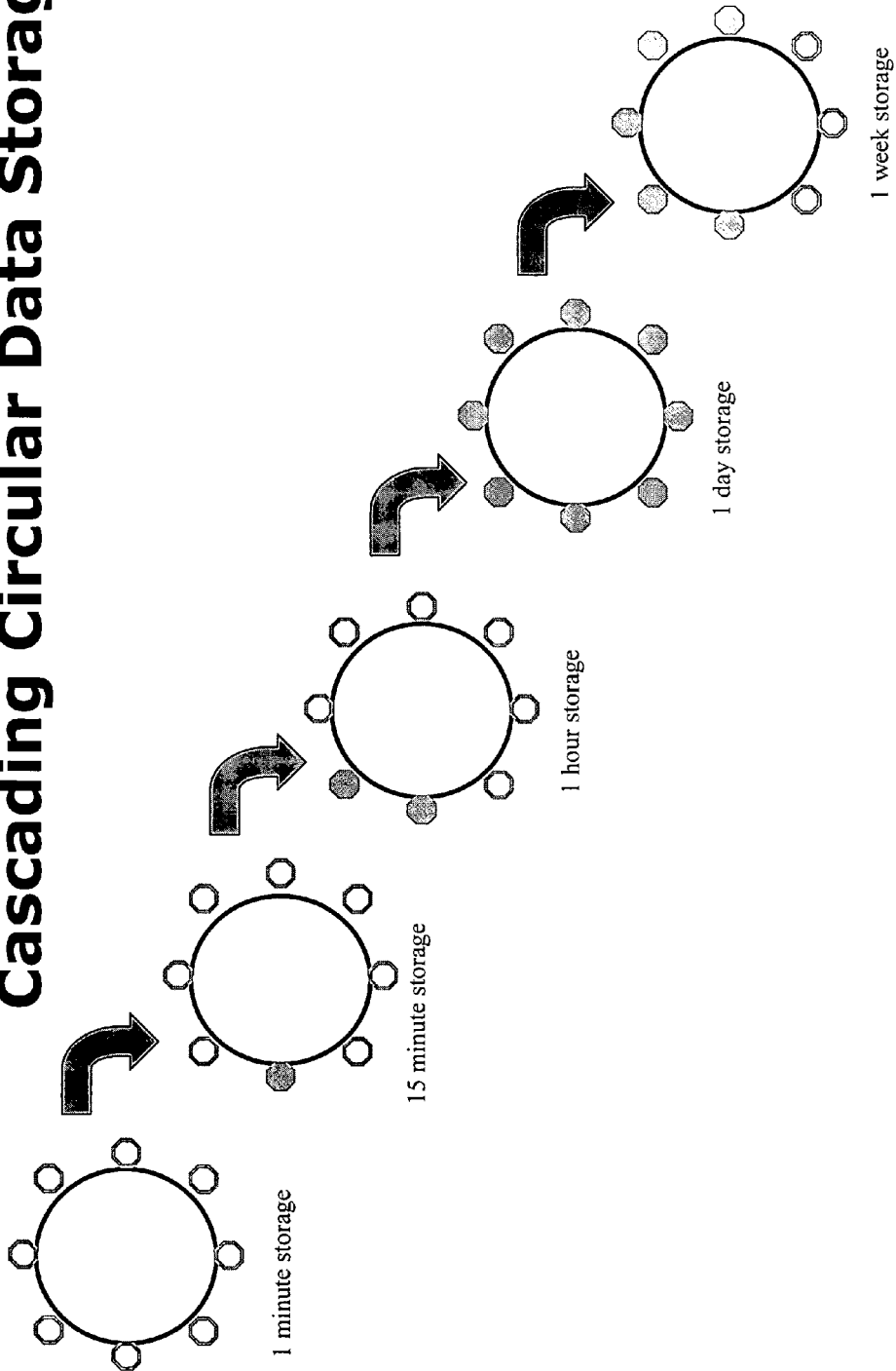
FIG. 8 depicts an exemplary cascading data storage consolidation from one circular data storage to another circular data storage, multiple levels.
Figure 9:
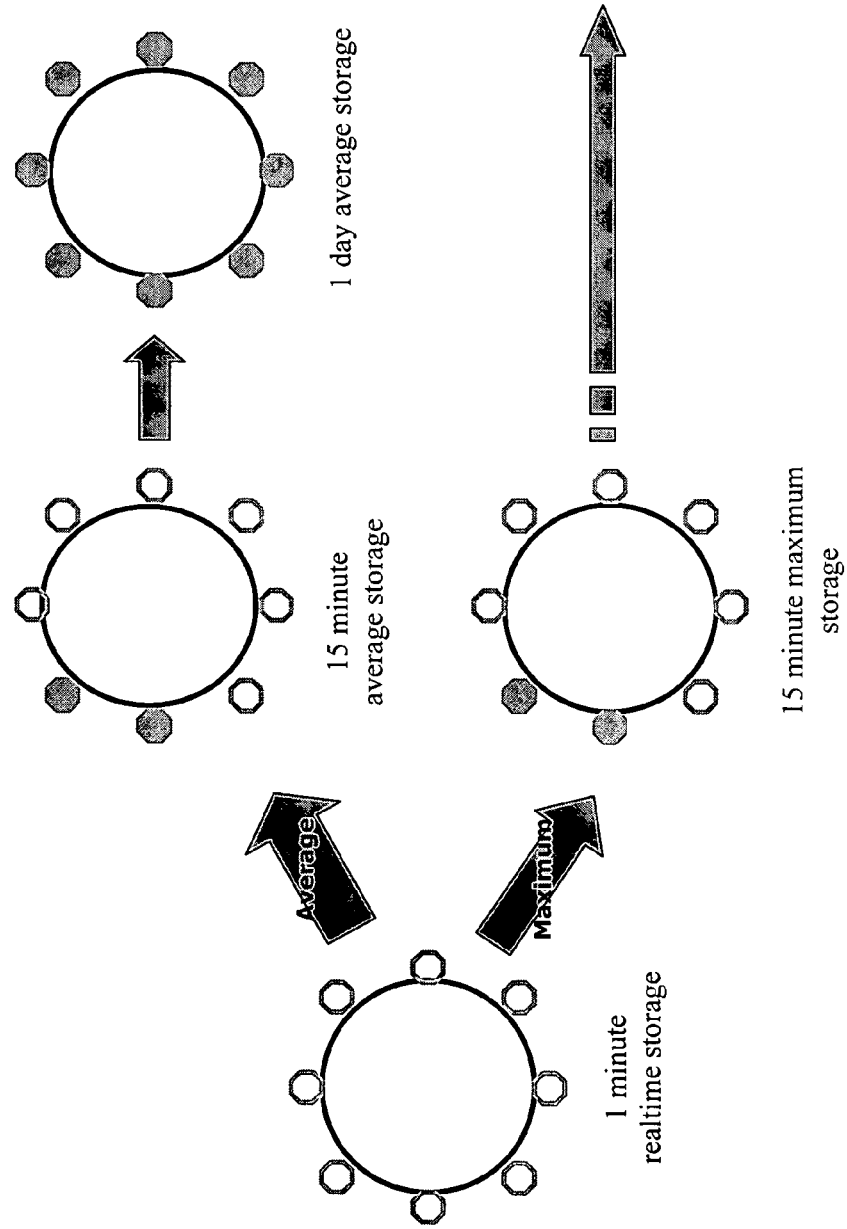
FIG. 9 depicts an exemplary cascading data storage consolidation from one circular data storage to another circular data storage, multiple levels, where data is handled based on type.

An energy management system will likely have some sort of historical database to store details of the energy usage over time. With traditional approach of "log everything" or even a majority of the measured data, the database can grow significantly over time and thus can become slower and less responsive to queries unless the database is manually trimmed and old records removed and archived. As records are removed from the database then those records are no longer available for queries thus limiting the historical trends and relationships that can be plotted and graphed. Obviously there is a need for a better database management technique, preferably one that can be automated without losing the ability to query data from older data sources. The typical system needs a large amount of detail initially for rich profiling over a short period, with the need changing to longer time periods and sparser intervals as the data ages. A solution to the database size issue is to post process the older data. As the data ages, the data can be aggregated over multiple detailed periods and then reentered into the database at a sparser interval. Once reentered then the original data can automatically be archived to another database/tape, etc and then deleted or just immediately deleted from the database to reduce the overall size. This automatic trimming can keep the database small and fast. In an alternative embodiment if the database detects abnormal or deviant data when it is aggregating and consolidating the data the database can keep the detailed data in the database for future analysis until user input verifies that deleting the data is safe. One embodiment of this overall scheme stores data in a circular fashion in a file of fixed size based on a configuration of store (quantity count and depth). See FIG. 6. At some point, older data is overwritten; by the time this happens the data is either of no interest or it has been consolidated into another data store as previously explained. To handle changing data density needs, a sequence of circular data stores can be used. As one is filled (previous data starts to be overwritten) some consolidation is performed (averaged, min'ed, max'ed, etc) and the consolidated value(s) are placed into the next available circular storage structure. See FIG. 7. Eventually the overwritten data is not consolidated any further. See FIGS. 8 and 9. Obviously different types of data can be consolidated at different rates depending on the usefulness of the data in the various reports required. The advantages of this scheme are that the database does not grow significantly over time and the trimming is done automatically by the database itself instead of manually. As time progresses the data also automatically becomes consolidated in a fashion that matches the requirements of the reports that can be run on that data. The consolidation will speed up database queries and thus the speed that reports can be generated. Alternatively, multiple databases can be used to archive the different groupings of data. As the data is aggregated the data is entered into a different database and then the original data can be overwritten with new data as it is entered.

The data recorded in an energy management database is typically interval data. The intervals can be as short as a few seconds or minutes or as long as daily or weekly. Most of the data will be recorded at shorter intervals in order to be able to track the energy system's performance as accurately as possible. In order to monitor a complete energy system, many parameters must be recorded at short intervals. This leads to a rapid growth of the database. As explained previously, an increase in database size causes a deterioration in query performance and at some point requires some kind of user interaction to either delete data from the database or move data out of the database through an archival process. Archived data is no longer easily accessible for queries. The disclosed embodiments utilize an algorithm that can potentially reduce the size and rate of growth of an energy management database by recording the variances in the data rather than the data points themselves. An example can be the recording of a voltage. Voltages typically move within a tight range without major variations. The proposed tool determines the interval of the recordings automatically and establishes an "expected" value for the voltage measurement as well as thresholds. The expected value and threshold can either be automatically determined by the system based on a programmed algorithm or entered by the user. The system then only stores the start time, recording interval and expected value for the voltage as well as the times and deviations when the actual value falls outside the threshold limit. These recorded quantities are sufficient to reconstruct the actual measured data points for reporting or analysis purposes. Depending on the threshold and the variability of the monitored quantities, a larger or smaller data compression factor can be achieved. This method can lead to some loss of accuracy depending on the threshold settings. By setting individual thresholds for different parameters, one can optimize the database growth rate and the required accuracy. One advantage of this proposed method over other data reduction methods such as aggregating parameters or archival is that the data resolution and accessibility is maintained while redundant data is removed from the database. The proposed algorithm can either be used on-line, as new measurements are written to the database, or it can be run as a batch process compressing an existing database. The stored "compressed" data contains additional statistical information such as rate of change and variance which can easily be used for statistical analysis methods, such as standard deviation calculations.

Enterprise Energy Management Log

Figure 10:
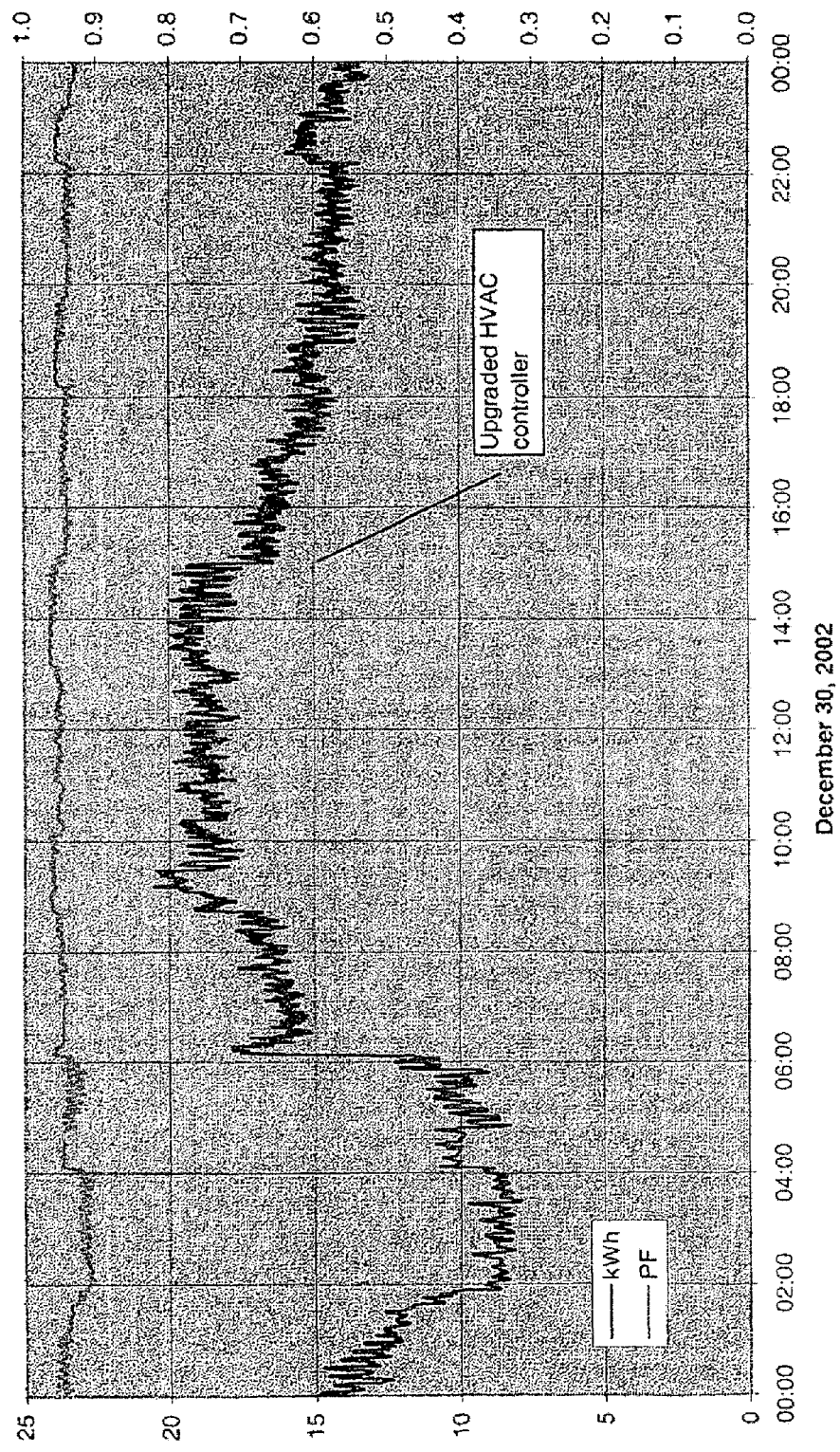
FIG. 10 depicts an exemplary sample graph with an overlaid annotation from the Enterprise Energy Management Log.

Part of energy management is correlating corporeal events with abstract energy data. When analyzing energy management data, the energy manager often needs to know what was going on within the organization at that particular time to assist in determining cause and effect. This information can allow for more effective management of the organization's energy use. As an organization's operation and planning staff carry out their daily tasks, they enter comments and notes into the EEM Log on events of interest that may affect energy related parameters. The EEM Log timestamps these notes and incorporates them into energy management reports so that the viewer can access the annotations as they view the report. See FIG. 10 for an example of a graph that shows a log entry overlaid on the graph to show a correlation between the log entry and changes in the graphed quantities. A further enhancement is to provide the user with a list of predefined log entries to save time and effort when typing the same or similar comments into the log. This list can have some predefined items, and can be customizable. Alternatively, the list can also include a list of recent entries that the user can select again (a most recently entered ("MRE") list). Entries can be automatically added by the EEM system itself when they are detected, for instance when the price of energy changes, when a shift change occurs, or when a PQ event happens. This automatic logging of events can allow the calculation of the ROI of the system or improvements made to the system automatically. Customers can easily forget the savings that an EEM system can provide them—by logging this information reports on this parameter can be generated like an other energy system parameter. Incorporating the log with the existing database of historical data automatically gives operational context to the energy management reports and improves the understanding of the information being presented in the report.

It is therefore intended that the foregoing detailed description be regarded as illustrative rather than limiting, and that it be understood that it is the following claims, including all equivalents, that are intended to define the spirit and scope of this invention.

We claim:

1. A method of identifying at least one unknown energy driver, the method comprising:
   receiving quantity metadata and energy usage data;
   receiving a time interval;
   determining at least one relationship between the quantity metadata and energy usage data by analyzing the quantity metadata and energy usage data within the time interval;
   assessing the quality of the at least one relationship to determine the quantity metadata contributing to the determined at least one relationship;
   identifying the at least one energy driver from the quantity metadata contributing to the determined at least one relationship by comparing the quantity metadata contributing to the determined at least one relationship with a predetermined list of potential energy drivers, wherein the at least one energy driver is a cause of energy consumption reflected by the energy usage data;
   outputting the identified at least one energy driver, wherein the outputted at least one energy driver is a variable that influences the energy consumption as reflected in the energy usage data;
   calculating a cost from the identified at least one energy driver; and
   controlling the identified at least one energy driver to reduce the cost of energy usage from the identified at least one energy driver.

2. The method of claim 1, wherein the predetermined list of potential energy drivers includes known variables effecting energy usage.

3. The method of claim 1, wherein the quantity metadata relates to production levels.

4. The method of claim 1, wherein the quantity metadata relates to production schedules.

5. The method of claim 1, wherein the quantity metadata relates to process variables.

6. The method of claim 1, wherein the determining comprises a linear regression analysis.

7. The method of claim 1, wherein the determining comprises a multivariate regression analysis.

8. The method of claim 1, wherein the determining comprises using at least one of algebraic formulae, fuzzy logic, genetic algorithms, fuzzy cognitive maps, and an expert system.

9. The method of claim 1, wherein the determining comprises searching only quantity metadata and energy usage data that are not ratiometrically linked.

10. The method of claim 1, wherein the outputting comprises outputting at least one of a relationship graph and a plain language description of the energy driver.

11. A system for identifying unknown energy drivers in an energy distribution network, the system comprising:
    an energy drivers application, the energy drivers application having:
    an input module operative to receive quantity metadata, predetermined energy driver quantities, energy usage data, and a time interval;
    a processing module coupled with the input module and operative to determine at least one relationship by analyzing the quantity metadata and energy usage data during the time interval, the processing module being further operable to assess the quality of the at least one relationship to determine the quantity metadata contributing to the determined at least one relationship and identify the at least one energy driver based on the quantity metadata contributing to the determined at least one relationship and based on a comparison with a list of predetermined energy driver quantities, wherein the at least one energy driver is a cause of energy consumption as reflected in the energy usage data; and
    an output module coupled with the processing module and operative to output the identified at least one energy driver; and
    a rate engine coupled with the output module and operative to calculate a cost of energy usage based on the identified at least one energy driver and further operative to reduce the cost of energy usage.

12. The system of claim 11, further comprising a network coupled with the input module, and operative to transmit said quantity metadata and energy usage data to said input module.

13. The system of claim 11, wherein the processing module is configured to manage energy usage by monitoring the identified at least one energy driver.

14. The system of claim 11, wherein the quantity metadata relates to production levels.

15. The system of claim 11, wherein the quantity metadata relates to production schedules.

16. The system of claim 11, wherein the quantity metadata relates to process variables.

17. The system of claim 11, wherein the processing module is further operative to determine the at least one relationship by analyzing the quantity metadata and energy usage data using a linear regression analysis.

18. The system of claim 11, wherein the processing module is further operative to determine the at least one relationship by analyzing the quantity metadata and energy usage data using a multivariate regression analysis.

19. The system of claim 11, wherein the processing module is further operative to determine the at least one relationship by analyzing the quantity metadata and energy usage data using at least one of algebraic formulae, fuzzy logic, genetic algorithms, fuzzy cognitive maps, and an expert system.

20. The system of claim 11, wherein the processing module is further operative to determine the at least one relationship by searching only quantity metadata and energy usage data that are not ratiometrically linked.

21. The system of claim 11, wherein the output module is further operative to output at least one of a relationship graph and a plain language description of the energy driver.

22. The system of claim 12, further comprising at least one IED coupled with said network and operative to generate and transmit said energy usage data to said input module of said energy drivers application via said network.

23. The system of claim 12, further comprising at least one measuring device coupled with said network and operative to generate and transmit said quantity metadata to said network.

24. A system for identifying unknown energy drivers in an energy distribution network, comprising:
   means for accepting quantity metadata and energy usage data;
   means for determining at least one relationship by analyzing the quantity metadata and energy usage data associated with consumed energy within a predetermined time interval;
   means for assessing the quality of the at least one relationship to determine the quantity metadata contributing to the determined at least one relationship;
   means for identifying at least one energy driver from a predetermined list of potential energy drivers based on the quantity metadata contributing to the determined at least one relationship, wherein the at least one energy driver is a cause of an amount of consumed energy that is reflected in the energy usage data;
   means for outputting the identified at least one energy driver;
   means for calculating a cost associated with operation of the at least one energy driver; and
   means for controlling the identified at least one energy driver based on the cost of energy usage from the identified at least one energy driver.

25. An energy drivers application implemented on a computer, the computer having a processor and a memory coupled with the processor, the energy drivers application comprising:
   first logic stored in the memory and executable by the processor and operable to accept quantity metadata, a list of potential energy drivers, and energy usage data;
   second logic stored in the memory, executable by the processor and coupled with the first logic, and operable to determine at least one relationship by analyzing the quantity metadata, energy usage data and comparing with the list of potential energy drivers, the second logic being further operable to assess the quality of the at least one relationship to determine the quantity metadata contributing to the determined at least one relationship and further identify the at least one energy driver from the quantity metadata contributing to the determined at least one relationship, wherein the at least one energy driver comprises a variable that is a cause of the energy usage data, the second logic further operative to calculate a cost from the identified at least one energy driver;
   third logic stored in the memory, executable by the processor and coupled with the second logic, and operable to output the at least one energy driver and the cost from the identified at least one energy driver; and
   fourth logic stored in the memory, executable by the processor and coupled with the third logic, and operable to monitor the at least one energy driver for management of energy usage and further operable to control the identified at least one energy driver based on the cost of the at least one energy driver.

26. An energy drivers application for use in an energy distribution network, comprising:
   an input module operative to accept quantity metadata, a list of potential energy drivers, and energy usage data;
   a processing module coupled with the input module and operative to determine at least one relationship by analyzing the quantity metadata and energy usage data within a chosen time period, the processing module being further operable to assess the quality of the at least one relationship through statistical analysis and identify at least one energy driver from the list of potential energy drivers based on the quantity metadata contributing to the determined at least one relationship, wherein the at least one energy driver comprises an external factor that is a cause of energy consumption as reflected in the energy usage data;
   an output module coupled with the processing module and operative to output the identified at least one energy driver and a cost associated with the identified at least one energy driver; and
   a control module coupled with the processing module and operative to control the identified at least one energy driver to reduce the cost of energy usage.

* * * * *